United States Patent
Tang et al.

(10) Patent No.: US 10,499,420 B2
(45) Date of Patent: Dec. 3, 2019

(54) UPLINK DATA SENDING APPARATUS AND METHOD, AND UPLINK DATA RECEIVING APPARATUS AND METHOD

(71) Applicant: Huawei Technologies Co., Ltd., Shenzhen, Guangdong (CN)

(72) Inventors: Xun Tang, Beijing (CN); Wei Quan, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 15/882,629

(22) Filed: Jan. 29, 2018

(65) Prior Publication Data

US 2018/0160443 A1    Jun. 7, 2018

Related U.S. Application Data

(63) Continuation of application No. PCT/CN2015/085470, filed on Jul. 29, 2015.

(51) Int. Cl.
*H04W 72/12* (2009.01)
*H04W 72/04* (2009.01)
(Continued)

(52) U.S. Cl.
CPC ..... *H04W 72/1284* (2013.01); *H04L 27/2613* (2013.01); *H04W 72/0413* (2013.01);
(Continued)

(58) Field of Classification Search
CPC .... H04W 72/0413; H04W 72/12–1289; H04L 5/005–0058
See application file for complete search history.

(56) References Cited

U.S. PATENT DOCUMENTS

2012/0236816 A1    9/2012 Park et al.
2013/0163536 A1    6/2013 Anderson et al.
(Continued)

FOREIGN PATENT DOCUMENTS

CN    102123399 A    7/2011
CN    103999526 A    8/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)"; 3GPP TS 36.211 V12.6.0; Jun. 2015; 136 pages.
(Continued)

*Primary Examiner* — Marcus Smith
(74) *Attorney, Agent, or Firm* — Huawei Technologies Co., Ltd.

(57) ABSTRACT

A method includes: configuring, by an eNB, a same uplink contention resource for multiple UEs; sending, by the UE, an SR to the eNB by using an SR symbol in the uplink contention resource, and sending uplink data to the eNB by using a shared symbol in the uplink contention resource; receiving, by the eNB, the SR sent by the UE by using the SR symbol in the uplink contention resource; and receiving, by the eNB, the uplink data sent by the UE by using the shared symbol in the uplink contention resource. This resolves a problem that when multiple UEs send uplink data to an eNB by using a same uplink contention resource and a contention collision occurs, the uplink contention resource is totally wasted.

11 Claims, 10 Drawing Sheets

(51) Int. Cl.
*H04W 74/08* (2009.01)
*H04L 5/00* (2006.01)
*H04W 74/02* (2009.01)
*H04L 27/26* (2006.01)
*H04W 74/00* (2009.01)

(52) U.S. Cl.
CPC ......... *H04W 72/12* (2013.01); *H04W 74/006* (2013.01); *H04W 74/02* (2013.01); *H04W 74/08* (2013.01); *H04L 5/0007* (2013.01); *H04W 72/0446* (2013.01)

(56) References Cited

U.S. PATENT DOCUMENTS

| | | | |
|---|---|---|---|
| 2015/0036601 A1* | 2/2015 | Kim | H04L 5/0048 370/329 |
| 2015/0201383 A1* | 7/2015 | Papasakellariou | H04W 52/367 370/278 |
| 2016/0057773 A1 | 2/2016 | Quan et al. | |
| 2016/0100430 A1 | 4/2016 | Dabeer et al. | |
| 2016/0150525 A1* | 5/2016 | Xu | H04W 74/006 370/329 |
| 2017/0019882 A1* | 1/2017 | Nimbalker | H04W 72/042 |
| 2017/0041103 A1* | 2/2017 | Maattanen | H04L 1/1671 |

FOREIGN PATENT DOCUMENTS

| | | |
|---|---|---|
| CN | 104160772 A | 11/2014 |
| CN | 104581972 A | 4/2015 |
| CN | 104601309 A | 5/2015 |
| JP | 2011142533 A | 7/2011 |
| JP | 2017535156 A | 11/2017 |
| WO | 2007022787 A1 | 3/2007 |
| WO | 2013096555 A1 | 6/2013 |
| WO | 2014000201 A1 | 1/2014 |

OTHER PUBLICATIONS

Ericsson; "Scheduling Request in E-UTRAN"; 3GPP TSG-RAN WG2 #56bis; Tdoc R2-070056; Sorrento, Italy; Jan. 15-19, 2007; 11 pages.

* cited by examiner

```
         CONT.                              CONT.
         FROM                               FROM
        FIG. 10A                           FIG. 10A
```

1008. The UE processes a predetermined base sequence by using the second cyclic shift value and the second time-domain orthogonal code, to generate a DMRS 1009. The UE sends the SR by adding the SR to an SR symbol in the uplink contention resource, sends the DMRS by adding the DMRS to a reference signal in the uplink contention resource, and sends uplink data by adding the uplink data to a data symbol in the uplink contention resource 1010. The eNB finds, according to the pre-stored first correspondence, a first cyclic shift value and a first time-domain orthogonal code that are corresponding to each code channel index 1011. The eNB detects, according to the first cyclic shift value and the first time-domain orthogonal code, whether signal energy on a code channel that is corresponding to the code channel index and that is on the SR symbol reaches a predetermined threshold 1012. If the signal energy reaches the predetermined threshold, the eNB determines that the SR sent by the UE corresponding to the code channel index is received 1013. For each successfully received SR, the eNB determines a code channel index corresponding to the SR

CONT.
FROM
FIG. 10B

CONT.
FROM
FIG. 10B

1014. The eNB finds, according to the pre-stored second correspondence, the pilot index corresponding to the code channel index, and the second cyclic shift value and the second time-domain orthogonal code that are corresponding to the pilot index 1015. The eNB performs, according to the second cyclic shift value and the second time-domain orthogonal code, channel estimation on the DMRS carried in the reference symbol in the uplink contention resource, to obtain a channel estimation result 1016. The eNB performs MU-MIMO decoding on the data symbol in the uplink contention resource according to the channel estimation result, to obtain the uplink data

FIG. 10C

UPLINK DATA SENDING APPARATUS AND METHOD, AND UPLINK DATA RECEIVING APPARATUS AND METHOD

CROSS-REFERENCE TO RELATED APPLICATIONS

This application is a continuation of International Application No. PCT/CN2015/085470, filed on Jul. 29, 2015, which is hereby incorporated by reference in its entirety.

TECHNICAL FIELD

The present application relates to the communications field, and in particular, to an uplink data sending apparatus and method, and an uplink data receiving apparatus and method.

BACKGROUND

In Long Term Evolution (LTE), user equipment (UE) generally sends uplink data to an evolved base station (Evolved Node B, eNB) in a scheduling-based sending manner.

When the UE needs to send the uplink data, the UE first needs to send an uplink scheduling request (SR) to the eNB. The eNB configures an uplink scheduling grant (UL) for the UE according to the SR, and the UL grant is used to configure an uplink transmission resource for the UE. When obtaining the UL grant by means of correct decoding, the UE sends the uplink data to the eNB according to the uplink transmission resource configured by the eNB. A time that needs to be consumed in an entire process is approximately 22.5 ms.

To reduce the time consumed in the process, a contention-based (CB) sending manner is proposed. In the contention-based sending manner, an eNB configures a same uplink contention resource for multiple user equipments in advance. When UE needs to send uplink data, the UE sends the uplink data to the eNB by using a latest uplink contention resource. However, if the multiple UEs send uplink data to the eNB on this uplink contention resource at the same time, a contention collision occurs.

SUMMARY

To resolve a problem in the prior art, embodiments of the present disclosure provide an uplink data sending apparatus and method, and an uplink data receiving apparatus and method.

According to a first aspect, an embodiment of the present disclosure provides an uplink data sending apparatus, and the apparatus includes:

a determining module, for determining an uplink contention resource, where the uplink contention resource includes an SR symbol for transmitting an uplink scheduling request SR and a shared symbol for transmitting uplink data; and a sending module, for sending the SR by using the SR symbol in the uplink contention resource; where the sending module is for sending the uplink data by using the shared symbol in the uplink contention resource.

In a first possible implementation of the first aspect, the sending module is for sending the SR on the SR symbol in the uplink contention resource by using a code channel corresponding to the UE.

With reference to the first possible implementation of the first aspect, in a second possible implementation of the first aspect, the determining module is for determining a code channel index allocated by the eNB;

the determining module is for finding, according to a pre-stored first correspondence, a first cyclic shift value and a first time-domain orthogonal code that are corresponding to the code channel index;

the determining module is for processing a predetermined base sequence by using the first cyclic shift value and the first time-domain orthogonal code, to generate the SR; and the sending module is for sending the SR by adding the SR to the SR symbol in the uplink contention resource.

In a third possible implementation of the first aspect, the sending module is for sending the uplink data on the shared symbol in the uplink contention resource in a multi-user multiple-input multiple-output MU-MIMO manner.

With reference to the third possible implementation of the first aspect, in a fourth possible implementation of the first aspect, the shared symbol includes a reference symbol for transmitting a demodulation reference signal DMRS and a data symbol for transmitting the uplink data;

the determining module is for determining a code channel index allocated by the eNB;

the determining module is for: finding, according to a pre-stored second correspondence, a pilot index corresponding to the code channel index, and a second cyclic shift value and a second time-domain orthogonal code that are corresponding to the pilot index, and processing a predetermined base sequence by using the second cyclic shift value and the second time-domain orthogonal code, to generate the DMRS;

the sending module is for sending the DMRS by adding the DMRS to the reference symbol in the uplink contention resource; and the sending module is for sending the uplink data by adding the uplink data to the data symbol in the uplink contention resource.

With reference to the fourth possible implementation of the first aspect, in a fifth possible implementation of the first aspect, the uplink data includes a modulation and coding scheme MCS and currently transmitted data; and the sending module is for performing multiplex transmission on the MCS and the currently transmitted data by separately adding the MCS and the currently transmitted data to the uplink contention resource, where a channel coding rate used for the MCS is lower than a channel coding rate used for the currently transmitted data.

With reference to any one of the first aspect or the first to the fifth possible implementations of the first aspect, in a sixth possible implementation of the first aspect, the apparatus further includes a receiving module;

the determining module is for obtaining a UE identifier allocated by the eNB, where the UE identifier includes a contention access-cell radio network temporary identifier CA-RNTI or a semi-persistent scheduling-contention access-cell radio network temporary identifier SPS-CA-RNTI;

the receiving module is for receiving downlink control information DCI from a physical downlink control channel PDCCH according to the UE identifier; and the determining module is for determining, from the DCI, the uplink contention resource configured by the eNB, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to any one of the first aspect or the first to the fifth and seventh possible implementations of the first aspect, the apparatus further includes a receiving module, and the receiving module is for receiving negative acknowledgement NACK information fed back by the eNB, where the NACK information is sent by the eNB when the eNB successfully receives the SR but fails to receive the uplink data corresponding to the SR; or the receiving module is for receiving an uplink scheduling grant UL grant fed back by the eNB, where the UL grant is sent by the eNB when the eNB successfully receives the SR but fails to receive the uplink data corresponding to the SR; and the sending module is for resending the uplink data according to the UL grant.

According to a second aspect, an embodiment of the present disclosure provides an uplink data receiving apparatus, and the apparatus includes:

a configuration module, for configuring an uplink contention resource for multiple user equipments UEs, where the uplink contention resource includes an SR symbol for transmitting an uplink scheduling request SR and a shared symbol for transmitting uplink data; and a receiving module, for receiving the SR by using the SR symbol in the uplink contention resource; where the receiving module is for receiving the uplink data by using the shared symbol in the uplink contention resource.

In a first possible implementation of the second aspect, the receiving module is for receiving the SR on the SR symbol in the uplink contention resource by using a code channel corresponding to each UE.

With reference to the first possible implementation of the second aspect, in a second possible implementation of the second aspect, the apparatus further includes a processing module;

the configuration module is for allocating a corresponding code channel index to the UE;

the processing module is for finding, according to a pre-stored first correspondence, a first cyclic shift value and a first time-domain orthogonal code that are corresponding to each code channel index;

the processing module is for detecting, according to the first cyclic shift value and the first time-domain orthogonal code, whether signal energy on a code channel that is corresponding to the code channel index and that is on the SR symbol reaches a predetermined threshold; and the processing module is for: if the signal energy reaches the predetermined threshold, determining that the SR sent by the UE corresponding to the code channel index is received.

In a third possible implementation of the second aspect, the receiving module is for receiving, on the shared symbol in the uplink contention resource, the uplink data sent in a multi-user multiple-input multiple-output MU-MIMO manner.

With reference to the third possible implementation of the second aspect, in a fourth possible implementation of the second aspect, the shared symbol includes a reference symbol for transmitting a demodulation reference signal DMRS and a data symbol for transmitting the uplink data, and the apparatus further includes a processing module;

the configuration module is for allocating a corresponding code channel index to the UE;

the processing module is for determining, for each successfully received SR, the code channel index corresponding to the SR;

the processing module is for finding, according to a pre-stored second correspondence, a pilot index corresponding to the code channel index, and a second cyclic shift value and a second time-domain orthogonal code that are corresponding to the pilot index;

the processing module is for performing, according to the second cyclic shift value and the second time-domain orthogonal code, channel estimation on the demodulation reference signal DMRS carried in the reference symbol in the uplink contention resource, to obtain a channel estimation result; and the processing module is for performing multi-user multiple-input multiple-output MU-MIMO decoding on the data symbol in the uplink contention resource according to the channel estimation result, to obtain the uplink data.

With reference to the fourth possible implementation of the second aspect, in a fifth possible implementation of the second aspect, the uplink data includes a modulation and coding scheme MCS and currently transmitted data; and the processing module is for performing, according to the MCS, demodulation and channel decoding on the currently transmitted data.

With reference to the second aspect, or the first possible implementation of the second aspect, or the second possible implementation of the second aspect, or the third possible implementation of the second aspect, or the fourth possible implementation of the second aspect, or the fifth possible implementation of the second aspect, in a sixth possible implementation of the second aspect, the apparatus further includes a sending module;

the configuration module is for allocating a corresponding UE identifier to the UE; and the sending module is for sending downlink control information DCI to each UE on a physical downlink control channel PDCCH according to a UE identifier, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to the second aspect, or the first possible implementation of the second aspect, or the second possible implementation of the second aspect, or the third possible implementation of the second aspect, or the fourth possible implementation of the second aspect, or the fifth possible implementation of the second aspect, in a seventh possible implementation of the second aspect, the apparatus further includes a processing module, and the processing module is for generating negative acknowledgement NACK information when the SR is successfully received but the uplink data corresponding to the SR fails to be received; and the sending module is for sending the NACK information to the UE corresponding to the SR; or the processing module is for: when the SR is successfully received but the uplink data corresponding to the SR fails to be received, generating an uplink scheduling grant UL grant for the UE corresponding to the SR; and the sending module is for sending the UL grant to the UE corresponding to the SR.

According to a third aspect, an embodiment of the present disclosure provides user equipment. The user equipment includes a processor, a memory, and a transceiver, the memory is for storing one or more instructions, and the processor is for executing the instructions;

the processor is for determining an uplink contention resource, where the uplink contention resource includes an SR symbol for transmitting an uplink scheduling request SR and a shared symbol for transmitting uplink data;

the processor is further for controlling the transceiver to send the SR by using the SR symbol in the uplink contention resource; and the processor is further for controlling the transceiver to send the uplink data by using the shared symbol in the uplink contention resource.

In a first possible implementation of the third aspect, the processor is further for controlling, on the SR symbol in the uplink contention resource, the transceiver to send the SR by using a code channel corresponding to the UE.

With reference to the first possible implementation of the third aspect, in a second possible implementation of the third aspect, the processor is further for determining a code channel index allocated by the eNB;

the processor is further for finding, according to a pre-stored first correspondence, a first cyclic shift value and a first time-domain orthogonal code that are corresponding to the code channel index;

the processor is further for processing a predetermined base sequence by using the first cyclic shift value and the first time-domain orthogonal code, to generate the SR; and the processor is further for controlling the transceiver to send the SR by adding the SR to the SR symbol in the uplink contention resource.

In a third possible implementation of the third aspect, the processor is for controlling, on the shared symbol in the uplink contention resource, the transceiver to send the uplink data in a multi-user multiple-input multiple-output MU-MIMO manner.

With reference to the third possible implementation of the third aspect, in a fourth possible implementation of the third aspect, the shared symbol includes a reference symbol for transmitting a demodulation reference signal DMRS and a data symbol for transmitting the uplink data;

the processor is further for determining a code channel index allocated by the eNB;

the processor is further for finding, according to a pre-stored second correspondence, a pilot index corresponding to the code channel index, and a second cyclic shift value and a second time-domain orthogonal code that are corresponding to the pilot index;

the processor is further for processing a predetermined base sequence by using the second cyclic shift value and the second time-domain orthogonal code, to generate the DMRS; and the processor is further for controlling the transceiver to send the DMRS by adding the DMRS to the reference symbol in the uplink contention resource, and to send the uplink data by adding the uplink data to the data symbol in the uplink contention resource.

With reference to the fourth possible implementation of the third aspect, in a fifth possible implementation of the third aspect, the uplink data includes a modulation and coding scheme MCS and currently transmitted data; and the processor is further for performing multiplex transmission on the MCS and the currently transmitted data by separately adding the MCS and the currently transmitted data to the uplink contention resource, where a channel coding rate used for the MCS is lower than a channel coding rate used for the currently transmitted data.

With reference to the third aspect, or the first possible implementation of the third aspect, or the second possible implementation of the third aspect, or the third possible implementation of the third aspect, or the fourth possible implementation of the third aspect, or the fifth possible implementation of the third aspect, in a sixth possible implementation of the third aspect, the processor is further for obtaining a UE identifier allocated by the eNB, where the UE identifier includes a contention access-cell radio network temporary identifier CA-RNTI or a semi-persistent scheduling-contention access-cell radio network temporary identifier SPS-CA-RNTI;

the processor is further for controlling the transceiver to receive downlink control information DCI from a physical downlink control channel PDCCH according to the UE identifier; and the processor is further for determining, from the DCI, the uplink contention resource configured by the eNB, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to the third aspect, or the first possible implementation of the third aspect, or the second possible implementation of the third aspect, or the third possible implementation of the third aspect, or the fourth possible implementation of the third aspect, or the fifth possible implementation of the third aspect, in a seventh possible implementation of the third aspect, the processor is further for controlling the transceiver to receive negative acknowledgement NACK information fed back by the eNB, where the NACK information is sent by the eNB when the eNB successfully receives the SR but fails to receive the uplink data corresponding to the SR; or the processor is further for: controlling the transceiver to receive an uplink scheduling grant UL grant fed back by the eNB, where the UL grant is sent by the eNB when the eNB successfully receives the SR but fails to receive the uplink data corresponding to the SR; and controlling the transceiver to resend the uplink data according to the UL grant.

According to a fourth aspect, an embodiment of the present disclosure provides an evolved base station. The base station includes a processor, a memory, and a transceiver, the memory is for storing one or more instructions, and the processor is for executing the instructions;

the processor is for configuring an uplink contention resource for multiple user equipments UEs, where the uplink contention resource includes an SR symbol for transmitting an uplink scheduling request SR and a shared symbol for transmitting uplink data;

the processor is further for controlling the transceiver to receive the SR by using the SR symbol in the uplink contention resource; and the processor is further for controlling the transceiver to receive the uplink data by using the shared symbol in the uplink contention resource. In a first possible implementation of the fourth aspect, the processor is for:

controlling, on the SR symbol in the uplink contention resource, the transceiver to receive the SR by using a code channel corresponding to each UE.

With reference to the first possible implementation of the fourth aspect, in a second possible implementation of the fourth aspect, the processor is further for allocating a corresponding code channel index to the UE;

the processor is further for finding, according to a pre-stored first correspondence, a first cyclic shift value and a first time-domain orthogonal code that are corresponding to each code channel index;

the processor is further for detecting, according to the first cyclic shift value and the first time-domain orthogonal code, whether signal energy on a code channel that is corresponding to the code channel index and that is on the SR symbol reaches a predetermined threshold; and the processor is further for: if the signal energy reaches the predetermined threshold, determining that the SR sent by the UE corresponding to the code channel index is received.

In a third possible implementation of the fourth aspect, the processor is further for controlling, on the shared symbol in the uplink contention resource, the transceiver to receive the uplink data sent in a multi-user multiple-input multiple-output MU-MIMO manner.

With reference to the third possible implementation of the fourth aspect, in a fourth possible implementation of the fourth aspect, the shared symbol includes a reference symbol for transmitting a demodulation reference signal DMRS and a data symbol for transmitting the uplink data;

the processor is further for allocating a corresponding code channel index to the UE;

the processor is further for determining, for each successfully received SR, the code channel index corresponding to the SR;

the processor is further for finding, according to a pre-stored second correspondence, a pilot index corresponding to the code channel index, and a second cyclic shift value and a second time-domain orthogonal code that are corresponding to the pilot index;

the processor is further for performing, according to the second cyclic shift value and the second time-domain orthogonal code, channel estimation on the demodulation reference signal DMRS carried in the reference symbol in the uplink contention resource, to obtain a channel estimation result; and the processor is further for performing multi-user multiple-input multiple-output MU-MIMO decoding on the data symbol in the uplink contention resource according to the channel estimation result, to obtain the uplink data.

With reference to the fourth possible implementation of the fourth aspect, in a fifth possible implementation of the fourth aspect, the uplink data includes a modulation and coding scheme MCS and currently transmitted data; and the processor is further for performing, according to the MCS, demodulation and channel decoding on the currently transmitted data.

With reference to the fourth aspect, or the first possible implementation of the fourth aspect, or the second possible implementation of the fourth aspect, or the third possible implementation of the fourth aspect, or the fourth possible implementation of the fourth aspect, or the fifth possible implementation of the fourth aspect, in a sixth possible implementation of the fourth aspect, the processor is further for allocating a corresponding UE identifier to the UE; and the processor is further for controlling the transceiver to send downlink control information DCI to each UE on a physical downlink control channel PDCCH according to a UE identifier, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to the fourth aspect, or the first possible implementation of the fourth aspect, or the second possible implementation of the fourth aspect, or the third possible implementation of the fourth aspect, or the fourth possible implementation of the fourth aspect, or the fifth possible implementation of the fourth aspect, in a seventh possible implementation of the fourth aspect, the processor is further for generating negative acknowledgement NACK information when the SR is successfully received but the uplink data corresponding to the SR fails to be received; and the processor is further for controlling the transceiver to send the NACK information to the UE corresponding to the SR; or the processor is further for: when the SR is successfully received but the uplink data corresponding to the SR fails to be received, generating an uplink scheduling grant UL grant for the UE corresponding to the SR; and the processor is further for controlling the transceiver to send the UL grant to the UE corresponding to the SR.

According to a fifth aspect, an embodiment of the present disclosure provides an uplink data sending and receiving system, and the uplink data sending and receiving system includes an eNB and UE;

the UE includes the uplink data sending apparatus provided in any one of the first aspect or the possible implementations of the first aspect, or the UE is the UE provided in any one of the third aspect or the possible implementations of the third aspect; and the eNB includes the uplink data receiving apparatus provided in any one of the second aspect or the possible implementations of the second aspect, or the eNB is the eNB provided in any one of the fourth aspect or the possible implementations of the fourth aspect.

According to a sixth aspect, an embodiment of the present disclosure provides an uplink data sending method, and the method includes:

determining an uplink contention resource, where the uplink contention resource includes an SR symbol for transmitting an uplink scheduling request SR and a shared symbol for transmitting uplink data;

sending the SR by using the SR symbol in the uplink contention resource; and sending the uplink data by using the shared symbol in the uplink contention resource.

In a first possible implementation of the sixth aspect, the sending the SR by using the SR symbol in the uplink contention resource includes:

sending the SR on the SR symbol in the uplink contention resource by using a code channel corresponding to the UE.

With reference to the first possible implementation of the sixth aspect, in a second possible implementation of the sixth aspect, before the sending the SR on the SR symbol in the uplink contention resource by using a code channel corresponding to the UE, the method further includes:

determining a code channel index allocated by an eNB; and the sending the SR on the SR symbol in the uplink contention resource by using a code channel corresponding to the UE includes:

finding, according to a pre-stored first correspondence, a first cyclic shift value and a first time-domain orthogonal code that are corresponding to the code channel index;

processing a predetermined base sequence by using the first cyclic shift value and the first time-domain orthogonal code, to generate the SR; and sending the SR by adding the SR to the SR symbol in the uplink contention resource.

In a third possible implementation of the sixth aspect, the sending the uplink data by using the shared symbol in the uplink contention resource includes:

sending the uplink data on the shared symbol in the uplink contention resource in a multi-user multiple-input multiple-output MU-MIMO manner.

With reference to the third possible implementation of the sixth aspect, in a fourth possible implementation of the sixth aspect, the shared symbol includes a reference symbol for transmitting a demodulation reference signal DMRS and a data symbol for transmitting the uplink data;

before the sending the uplink data on the shared symbol in the uplink contention resource in a multi-user multiple-input multiple-output MU-MIMO manner, the method further includes:

determining a code channel index allocated by the eNB; and the sending the uplink data on the shared symbol in the uplink contention resource in a multi-user multiple-input multiple-output MU-MIMO manner includes:

finding, according to a pre-stored second correspondence, a pilot index corresponding to the code channel index, and a second cyclic shift value and a second time-domain orthogonal code that are corresponding to the pilot index;

processing a predetermined base sequence by using the second cyclic shift value and the second time-domain orthogonal code, to generate the DMRS; and sending the DMRS by adding the DMRS to the reference symbol in the uplink contention resource, and sending the uplink data by adding the uplink data to the data symbol in the uplink contention resource.

With reference to the fourth possible implementation of the sixth aspect, in a fifth possible implementation of the sixth aspect, the uplink data includes a modulation and coding scheme MCS and currently transmitted data; and the sending the uplink data by adding the uplink data to the data symbol in the uplink contention resource includes:

performing multiplex transmission on the MCS and the currently transmitted data by separately adding the MCS and the currently transmitted data to the uplink contention resource, where a channel coding rate used for the MCS is lower than a channel coding rate used for the currently transmitted data.

With reference to the sixth aspect, or the first possible implementation of the sixth aspect, or the second possible implementation of the sixth aspect, or the third possible implementation of the sixth aspect, or the fourth possible implementation of the sixth aspect, or the fifth possible implementation of the sixth aspect, in a sixth possible implementation of the sixth aspect, the determining an uplink contention resource includes:

obtaining a UE identifier allocated by the eNB, where the UE identifier includes a contention access-cell radio network temporary identifier CA-RNTI or a semi-persistent scheduling-contention access-cell radio network temporary identifier SPS-CA-RNTI;

receiving downlink control information DCI from a physical downlink control channel PDCCH according to the UE identifier; and determining, from the DCI, the uplink contention resource configured by the eNB, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to the sixth aspect, or the first possible implementation of the sixth aspect, or the second possible implementation of the sixth aspect, or the third possible implementation of the sixth aspect, or the fourth possible implementation of the sixth aspect, or the fifth possible implementation of the sixth aspect, in a seventh possible implementation of the sixth aspect, after the sending the uplink data by using the shared symbol in the uplink contention resource, the method further includes:

receiving negative acknowledgement NACK information fed back by the eNB, where the NACK information is sent by the eNB when the eNB successfully receives the SR but fails to receive the uplink data corresponding to the SR; or receiving an uplink scheduling grant UL grant fed back by the eNB, where the UL grant is sent by the eNB when the eNB successfully receives the SR but fails to receive the uplink data corresponding to the SR; and resending the uplink data according to the UL grant.

According to a seventh aspect, an embodiment of the present disclosure provides an uplink data receiving method, and the method includes:

configuring an uplink contention resource for multiple user equipments UEs, where the uplink contention resource includes an SR symbol for transmitting an uplink scheduling request SR and a shared symbol for transmitting uplink data;

receiving the SR by using the SR symbol in the uplink contention resource; and receiving the uplink data by using the shared symbol in the uplink contention resource.

In a first possible implementation of the seventh aspect, the receiving the SR by using the SR symbol in the uplink contention resource includes:

receiving the SR on the SR symbol in the uplink contention resource by using a code channel corresponding to each UE.

With reference to the first possible implementation of the seventh aspect, in a second possible implementation of the seventh aspect, before the receiving the SR on the SR symbol in the uplink contention resource by using a code channel corresponding to each UE, the method further includes:

allocating a corresponding code channel index to the UE; and the receiving the SR on the SR symbol in the uplink contention resource by using a code channel corresponding to each UE includes:

finding, according to a pre-stored first correspondence, a first cyclic shift value and a first time-domain orthogonal code that are corresponding to each code channel index;

detecting, according to the first cyclic shift value and the first time-domain orthogonal code, whether signal energy on a code channel that is corresponding to the code channel index and that is on the SR symbol reaches a predetermined threshold; and if the signal energy reaches the predetermined threshold, determining that the SR sent by the UE corresponding to the code channel index is received.

In a third possible implementation of the seventh aspect, the receiving the uplink data by using the shared symbol in the uplink contention resource includes:

receiving, on the shared symbol in the uplink contention resource, the uplink data sent in a multi-user multiple-input multiple-output MU-MIMO manner.

With reference to the third possible implementation of the seventh aspect, in a fourth possible implementation of the seventh aspect, the shared symbol includes a reference symbol for transmitting a demodulation reference signal DMRS and a data symbol for transmitting the uplink data;

before the receiving, on the shared symbol in the uplink contention resource, the uplink data sent in a MU-MIMO manner, the method further includes:

allocating a corresponding code channel index to the UE; and the receiving, on the shared symbol in the uplink contention resource, the uplink data sent in a MU-MIMO manner includes:

determining, for each successfully received SR, the code channel index corresponding to the SR;

finding, according to a pre-stored second correspondence, a pilot index corresponding to the code channel index, and a second cyclic shift value and a second time-domain orthogonal code that are corresponding to the pilot index;

performing, according to the second cyclic shift value and the second time-domain orthogonal code, channel estimation on the demodulation reference signal DMRS carried in the reference symbol in the uplink contention resource, to obtain a channel estimation result; and performing multi-user multiple-input multiple-output MU-MIMO decoding on the data symbol in the uplink contention resource according to the channel estimation result, to obtain the uplink data.

With reference to the fourth possible implementation of the seventh aspect, in a fifth possible implementation of the seventh aspect, the uplink data includes a modulation and coding scheme MCS and currently transmitted data; and after the performing multi-user multiple-input multiple-output MU-MIMO decoding on the data symbol in the uplink contention resource according to the channel estimation result, to obtain the uplink data, the method further includes:

performing, according to the MCS, demodulation and channel decoding on the currently transmitted data.

With reference to the seventh aspect, or the first possible implementation of the seventh aspect, or the second possible implementation of the seventh aspect, or the third possible implementation of the seventh aspect, or the fourth possible implementation of the seventh aspect, or the fifth possible implementation of the seventh aspect, in a sixth possible implementation of the seventh aspect, the configuring an uplink contention resource for multiple user equipment UEs includes:

allocating a corresponding UE identifier to the UE; and sending downlink control information DCI to each UE on a physical downlink control channel PDCCH according to a UE identifier, where a DCI format format 0 including an extension field is used for the DCI, an original field of the DCI format 0 includes symbol information corresponding to the shared symbol in the uplink contention resource, and a quantity and a starting location of a resource block occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of a resource block occupied by the uplink contention resource.

With reference to the seventh aspect, or the first possible implementation of the seventh aspect, or the second possible implementation of the seventh aspect, or the third possible implementation of the seventh aspect, or the fourth possible implementation of the seventh aspect, or the fifth possible implementation of the seventh aspect, in a seventh possible implementation of the seventh aspect, after the receiving the uplink data by using the shared symbol in the uplink contention resource, the method further includes:

generating negative acknowledgement NACK information when the SR is successfully received but the uplink data corresponding to the SR fails to be received; and sending the NACK information to the UE corresponding to the SR; or when the SR is successfully received but the uplink data corresponding to the SR fails to be received, generating an uplink scheduling grant UL grant for the UE corresponding to the SR; and sending the UL grant to the UE corresponding to the SR.

Beneficial effects of the technical solutions provided in the embodiments of the present disclosure are as follows:

The eNB configures a same uplink contention resource for the multiple UEs, and the uplink contention resource includes the SR symbol for transmitting the SR and the shared symbol for transmitting the uplink data; the UE sends the SR to the eNB by using the SR symbol in the uplink contention resource, and sends the uplink data to the eNB by using the shared symbol in the uplink contention resource; and the eNB receives the SR of the UE by using the SR symbol in the uplink contention resource, and receives the uplink data of the UE by using the shared symbol in the uplink contention resource. This resolves a prior-art problem that when multiple UEs send uplink data to an eNB by using a same uplink contention resource and a contention collision occurs, the eNB may fail to decode the uplink data sent by all the UEs. A new contention-based uplink data transmission manner is provided. In this uplink data transmission manner, when failing to receive the uplink data of the UEs, the eNB may still determine, according to a successfully received SR, specific UE that sends uplink data.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 10A, FIGS. 10B, and 10C are a flowchart of an uplink data sending method according to another embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Subframe: In a time domain, LTE transmission is performed in a radio frame with a length of 10 ms, each radio frame is divided into 10 subframes with a same size of 1 ms, each subframe includes two timeslots with a same size, and each timeslot includes a particular quantity of orthogonal frequency division multiplexing (OFDM) symbols including a cyclic prefix. If the cyclic prefix is a normal cyclic prefix, each timeslot includes seven OFDM symbols. If the cyclic prefix is an extended cyclic prefix, each timeslot includes six OFDM symbols. The OFDM symbols are referred to as symbols below for short.

Figure 1:
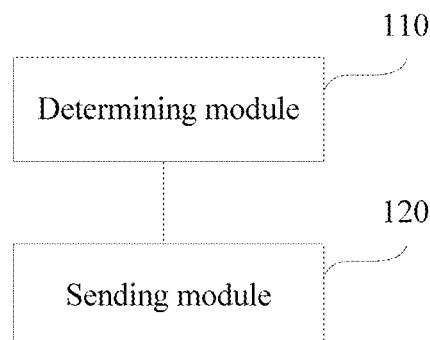
FIG. 1 is a block diagram of an uplink data sending apparatus according to an embodiment of the present disclosure.

Referring to FIG. 1, FIG. 1 shows a block diagram of an uplink data sending apparatus according to an embodiment of the present disclosure. The uplink data sending apparatus may be implemented as all or a part of UE by using software, hardware, or a combination of software and hardware. The uplink data sending apparatus may include a determining module 110 and a sending module 120.

The determining module 110 is for determining an uplink contention resource, where the uplink contention resource includes an SR symbol for transmitting an SR and a shared symbol for transmitting uplink data.

Multiple UEs may share a same uplink contention resource, and send uplink data to an eNB in a contention-based manner.

In this embodiment of the present disclosure, some symbols in the uplink contention resource are classified as SR symbols for transmitting SRs, and the other symbols in the uplink contention resource are classified as shared symbols for transmitting uplink data. An SR is used to notify the eNB that the UE needs to send uplink data.

The sending module 120 is for sending the SR by using the SR symbol in the uplink contention resource.

The sending module 120 is for sending the uplink data by using the shared symbol in the uplink contention resource.

In conclusion, in the uplink data sending apparatus provided in this embodiment, the UE first determines the uplink contention resource, sends the SR to the eNB by using the SR symbol in the uplink contention resource, and sends the uplink data to the eNB by using the shared symbol in the uplink contention resource. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data, so that the uplink contention resource is not wasted.

Figure 2:
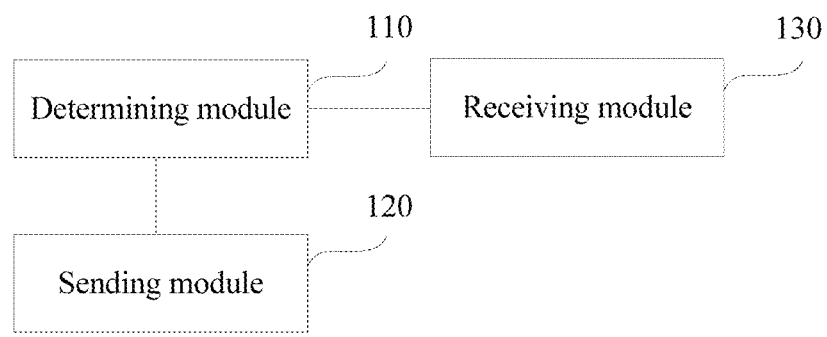
FIG. 2 is a block diagram of an uplink data sending apparatus according to another embodiment of the present disclosure.

Referring to FIG. 2, FIG. 2 shows a block diagram of an uplink data sending apparatus according to another embodiment of the present disclosure. The uplink data sending apparatus may be implemented as all or a part of UE by using software, hardware, or a combination of software and hardware. The uplink data sending apparatus may include a determining module 110, a sending module 120, and a receiving module 130.

The determining module 110 is for determining an uplink contention resource, where the uplink contention resource includes an SR symbol for transmitting an uplink SR and a shared symbol for transmitting uplink data.

The determining module 110 is further for obtaining a UE identifier allocated by an eNB.

The receiving module 130 is for receiving DCI (downlink control information) from a physical downlink control channel (PDCCH) according to the UE identifier. Only UE having the UE identifier can successfully descramble the DCI.

The determining module 110 is further for determining, from the DCI, the uplink contention resource configured by the eNB.

The determining module 110 is further for determining a code channel index allocated by the eNB.

The sending module 120 is for sending the SR on the SR symbol in the uplink contention resource by using a code channel corresponding to the UE.

In this embodiment, the determining module 110 is further for finding, according to a pre-stored first correspondence, a first cyclic shift value and a first time-domain orthogonal code that are corresponding to the code channel index. The determining module 110 is further for processing a predetermined base sequence by using the first cyclic shift value and the first time-domain orthogonal code, to generate the SR.

The sending module 120 is for sending the SR by adding the SR to the SR symbol in the uplink contention resource.

The sending module 120 is for sending the uplink data on the shared symbol in the uplink contention resource in a multi-user multiple-input multiple-output (MU-MIMO) manner.

The determining module 110 is further for finding, according to a pre-stored second correspondence, a pilot index corresponding to the code channel index, and a second cyclic shift value and a second time-domain orthogonal code that are corresponding to the pilot index. The determining module 110 is further for processing a predetermined base sequence by using the second cyclic shift value and the second time-domain orthogonal code, to generate a demodulation reference signal (DMRS).

The sending module 120 is for sending the DMRS by adding the DMRS to a reference symbol in the uplink contention resource.

The sending module 120 is for sending the uplink data by adding the uplink data to a data symbol in the uplink contention resource.

The uplink data includes a modulation and coding scheme (MCS) and currently transmitted data.

The sending module 120 is further for performing multiplex transmission on the MCS and the currently transmitted data by separately adding the MCS and the currently transmitted data to the uplink contention resource. A channel coding rate used for the MCS is lower than a channel coding rate used for the currently transmitted data.

The receiving module 130 is for receiving negative acknowledgement (NACK) information fed back by the eNB, where the NACK information is sent by the eNB when the eNB successfully receives the SR but fails to receive the uplink data corresponding to the SR.

Alternatively, the receiving module 130 is for receiving a UL grant fed back by the eNB, where the UL grant is sent by the eNB when the eNB successfully receives the SR but fails to receive the uplink data corresponding to the SR. The sending module 120 is for resending the uplink data according to the UL grant.

In comparison with the previous embodiment, in the uplink data sending apparatus provided in this embodiment, the UE receives acknowledgement (ACK) information or the NACK information delivered by the eNB, so that the UE can obtain a feedback from an eNB side even if the UE fails to transmit the uplink data in a contention manner. Then, the UE determines whether to resend the uplink data or continue to transmit other uplink data, so that efficiency of communication between the eNB and the UE is improved.

In comparison with the previous embodiment, in the uplink data sending apparatus provided in this embodiment, the UE receives the UL grant delivered by the eNB, so that the UE can retransmit the uplink data in a scheduling-based manner. Therefore, signaling interaction between the UE and the eNB is effectively reduced, and signaling resources on an eNB side are saved.

Figure 3:
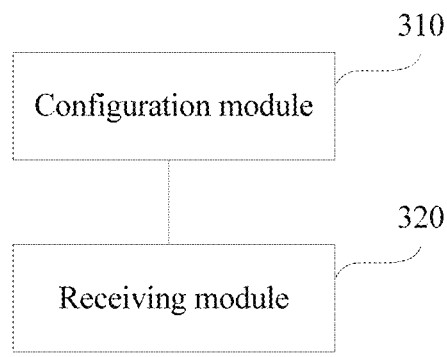
FIG. 3 is a block diagram of an uplink data receiving apparatus according to an embodiment of the present disclosure.

Referring to FIG. 3, FIG. 3 shows a block diagram of an uplink data receiving apparatus according to an embodiment of the present disclosure. The uplink data receiving apparatus may be implemented as all or a part of an eNB by using software, hardware, or a combination of software and hardware. The uplink data receiving apparatus may include a configuration module 310 and a receiving module 320.

The configuration module 310 is for configuring an uplink contention resource for multiple UEs, where the uplink contention resource includes an SR symbol for transmitting an SR and a shared symbol for transmitting uplink data.

The receiving module 320 is for receiving the SR by using the SR symbol in the uplink contention resource.

The receiving module 320 is further for receiving the uplink data by using the shared symbol in the uplink contention resource.

In conclusion, in the uplink data receiving apparatus provided in this embodiment, the eNB configures the uplink contention resource for multiple user equipment (UEs), receives, by using the SR symbol in the uplink contention resource, the SR sent by the UE, and receives, by using the shared symbol in the uplink contention resource, the uplink data sent by the UE. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data, so that the uplink contention resource is not wasted.

Figure 4:
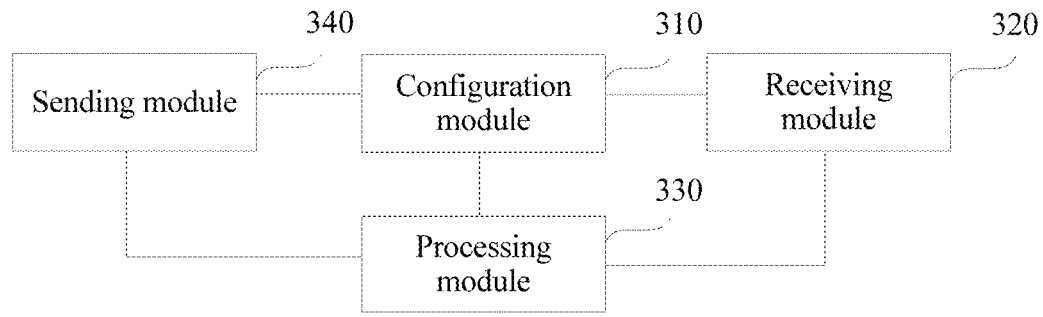
FIG. 4 is a block diagram of an uplink data receiving apparatus according to another embodiment of the present disclosure.

Referring to FIG. 4, FIG. 4 shows a block diagram of an uplink data receiving apparatus according to another embodiment of the present disclosure. The uplink data receiving apparatus may be implemented as all or a part of an eNB by using software, hardware, or a combination of software and hardware. The uplink data receiving apparatus may include a configuration module 310, a receiving module 320, a processing module 330, and a sending module 340.

The configuration module 310 is for configuring an uplink contention resource for multiple user equipments UEs, where the uplink contention resource includes an SR symbol for transmitting an SR and a shared symbol for transmitting uplink data.

The configuration module 310 is further for allocating a corresponding UE identifier to the UE.

When there are multiple UEs, the configuration module 310 allocates respectively corresponding UE identifiers to the multiple UEs.

Optionally, the UE identifier includes:

a contention access-cell radio network temporary identifier (CA-RNTI), or a semi-persistent scheduling-contention access-cell radio network temporary identifier (SPS-CA-RNTI).

The sending module 340 is for sending DCI to each UE on a PDCCH according to a UE identifier.

Optionally, a DCI format 0 including an extension field or a newly defined DCI format CA is used as an information format of the DCI.

An original field of the DCI format 0 includes symbol information corresponding to the shared symbol in the uplink contention resource, and a quantity and a starting location of a resource block (RB) occupied by the uplink contention resource. The extension field of the DCI format 0 includes symbol information for indicating the SR symbol, that is, the extension field carries the symbol information of the SR symbol. Optionally, the symbol information is an SR symbol quantity, an SR symbol location, or the like. The SR symbol quantity is used to indicate a quantity of symbols occupied by the SR in the uplink contention resource. The SR symbol location is used to indicate a symbol location of the SR symbol in the uplink contention resource.

The DCI format CA is a redesigned DCI format. The DCI format CA includes symbol information of the SR symbol, symbol information corresponding to the shared symbol, and a quantity and a starting location of an RB occupied by the uplink contention resource. For example, the DCI format CA includes RB allocation, an SR symbol quantity, an SR symbol location, and a pilot group number. The RB allocation is used to indicate a location of the RB occupied by the uplink contention resource in a frequency domain. The SR symbol quantity is used to indicate a quantity of symbols occupied by the SR in the uplink contention resource. The SR symbol location is used to indicate a symbol location of the SR symbol in the uplink contention resource.

The configuration module 310 is for allocating a corresponding code channel index to the UE.

When there are multiple UEs, the configuration module 310 allocates respectively corresponding code channel indexes to the multiple UEs.

The receiving module 320 is for receiving the SR on the SR symbol in the uplink contention resource by using a code channel corresponding to each UE.

In this embodiment, the apparatus further includes the processing module 330.

The processing module 330 is for finding, according to a pre-stored first correspondence, a first cyclic shift value and a first time-domain orthogonal code that are corresponding to each code channel index.

The processing module 330 is for detecting, according to the first cyclic shift value and the first time-domain orthogonal code, whether signal energy on a code channel that is corresponding to the code channel index and that is on the SR symbol reaches a predetermined threshold.

The processing module 330 is for: when the signal energy reaches the predetermined threshold, determining that the SR sent by the UE corresponding to the code channel index is received.

The processing module 330 is for receiving, on the shared symbol in the uplink contention resource, the uplink data sent in a MU-MIMO manner.

The processing module 330 is for determining, for each successfully received SR, a code channel index corresponding to the SR.

The processing module 330 is for finding, according to a pre-stored second correspondence, a pilot index corresponding to the code channel index, and a second cyclic shift value and a second time-domain orthogonal code that are corresponding to the pilot index.

The processing module 330 is for performing, according to the second cyclic shift value and the second time-domain orthogonal code, channel estimation on a DMRS carried in a reference symbol in the uplink contention resource, to obtain a channel estimation result.

The processing module 330 is for performing MU-MIMO decoding on a data symbol in the uplink contention resource according to the channel estimation result, to obtain the uplink data.

It should be noted that, if the uplink data includes an MCS and currently transmitted data, after the eNB obtains the uplink data by means of decoding, the processing module 330 is further for performing, according to the MCS, demodulation and channel decoding on the currently transmitted data.

The processing module 330 is for generating NACK information when the SR is successfully received but the uplink data corresponding to the SR fails to be received. The sending module 340 is for sending the NACK information to the UE corresponding to the SR.

Alternatively, the processing module 330 is for: when the SR is successfully received but the uplink data corresponding to the SR fails to be received, generating a UL grant for the UE corresponding to the SR. The sending module 340 is for sending the UL grant to the UE corresponding to the SR.

In comparison with the previous embodiment, in the uplink data receiving apparatus provided in this embodiment, the eNB delivers ACK information or the NACK information to the UE, so that the UE can obtain a feedback from an eNB side even if the UE fails to transmit the uplink data in a contention manner. Then, the UE determines whether to resend the uplink data or continue to transmit other uplink data, so that efficiency of communication between the eNB and the UE is improved.

In comparison with the previous embodiment, in the uplink data receiving apparatus provided in this embodiment, the eNB directly delivers the UL grant to the UE that fails to transmit the uplink data, so that the UE can retransmit the uplink data in a scheduling-based manner. Therefore, signaling interaction between the UE and the eNB is effectively reduced, and signaling resources on an eNB side are saved.

It should be noted that, when the uplink data sending apparatus provided in the foregoing embodiment sends uplink data and the uplink data receiving apparatus provided in the foregoing embodiment receives uplink data, division of the foregoing function modules is merely used as an example for description. In actual application, the foregoing functions may be allocated to different function modules for implementation according to a requirement, that is, internal structures of the devices are divided into different function modules, to implement all or some of the foregoing described functions. The receiving module and the sending module may be implemented by a processor by controlling a transceiver. The determining module, the configuration module, and the processing module may be implemented by the processor by executing instructions stored in a memory.

Figure 5:
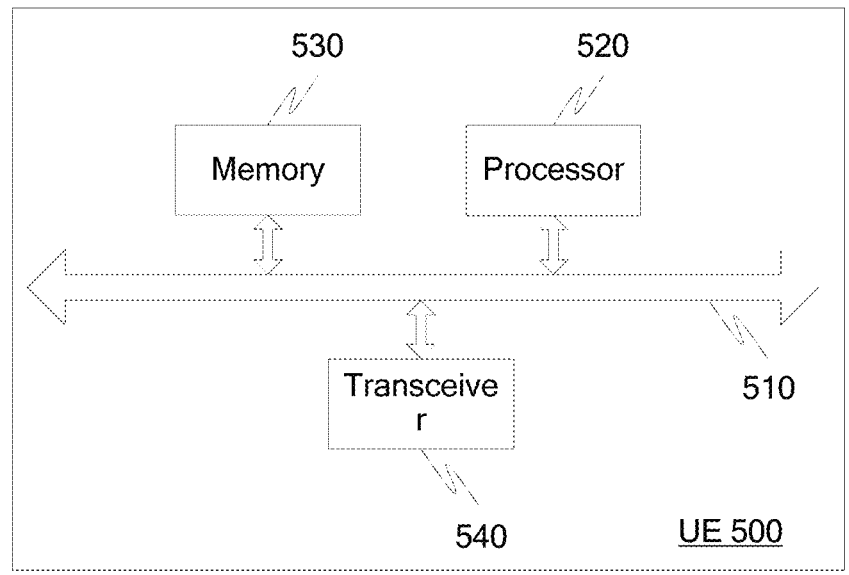
FIG. 5 is a structural block diagram of user equipment according to an embodiment of the present disclosure.

Referring to FIG. 5, FIG. 5 shows a structural block diagram of UE according to an embodiment of the present disclosure. As shown in FIG. 5, UE 500 includes a bus 510, and a processor 520, a memory 530, and a transceiver 540 that communicate with each other by using the bus 510. The memory 530 is for storing one or more instructions, and the processor 520 is for executing the instructions.

The processor 520 is for determining an uplink contention resource, where the uplink contention resource includes an SR symbol for transmitting an uplink SR and a shared symbol for transmitting uplink data.

The processor 520 is further for controlling the transceiver 540 to send the SR by using the SR symbol in the uplink contention resource.

The processor 520 is further for controlling the transceiver 540 to send the uplink data by using the shared symbol in the uplink contention resource.

In conclusion, the UE provided in this embodiment determines the uplink contention resource, controls the transceiver to send the SR by using the SR symbol in the uplink contention resource, and controls the transceiver to send the uplink data by using the shared symbol in the uplink contention resource. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data.

In an optional embodiment provided based on the embodiment shown in FIG. 5, the processor 520 is for:

controlling, on the SR symbol in the uplink contention resource, the transceiver 540 to send the SR by using a code channel corresponding to the UE.

In an optional embodiment provided based on the embodiment shown in FIG. 5, the processor 520 is further for determining a code channel index allocated by the eNB;

the processor 520 is for finding, according to a pre-stored first correspondence, a first cyclic shift value and a first time-domain orthogonal code that are corresponding to the code channel index;

the processor 520 is for processing a predetermined base sequence by using the first cyclic shift value and the first time-domain orthogonal code, to generate the SR; and the processor 520 is for controlling the transceiver 540 to send the SR by adding the SR to the SR symbol in the uplink contention resource.

In an optional embodiment provided based on the embodiment shown in FIG. 5, the processor 520 is for controlling, on the shared symbol in the uplink contention resource, the transceiver 540 to send the uplink data in a multi-user multiple-input multiple-output MU-MIMO manner.

In an optional embodiment provided based on the embodiment shown in FIG. 5, the shared symbol includes a reference symbol for transmitting a DMRS and a data symbol for transmitting the uplink data;

the processor 520 is further for determining a code channel index allocated by the eNB;

the processor 520 is for finding, according to a pre-stored second correspondence, a pilot index corresponding to the code channel index, and a second cyclic shift value and a second time-domain orthogonal code that are corresponding to the pilot index;

the processor 520 is for processing a predetermined base sequence by using the second cyclic shift value and the second time-domain orthogonal code, to generate the DMRS; and the processor 520 is for controlling the transceiver 540 to send the DMRS by adding the DMRS to the reference symbol in the uplink contention resource, and to send the uplink data by adding the uplink data to the data symbol in the uplink contention resource.

In an optional embodiment provided based on the embodiment shown in FIG. 5, the uplink data includes an MCS and currently transmitted data; and the processor 520 is for performing multiplex transmission on the MCS and the currently transmitted data by separately adding the MCS and the currently transmitted data to the uplink contention resource.

A channel coding rate used for the MCS is lower than a channel coding rate used for the currently transmitted data.

In an optional embodiment provided based on the embodiment shown in FIG. 5, the processor 520 is for obtaining a UE identifier allocated by the eNB, where the UE identifier includes a CA-RNTI or an SPS-CA-RNTI; the processor 520 is for controlling the transceiver 540 to receive downlink control information DCI from a PDCCH according to the UE identifier; and the processor 520 is further for determining, from the DCI, the uplink contention resource configured by the eNB.

A DCI format 0 including an extension field is used for the DCI, an original field of the DCI format 0 includes symbol information corresponding to the shared symbol in the uplink contention resource, and a quantity and a starting location of an RB occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of an RB occupied by the uplink contention resource.

In an optional embodiment provided based on the embodiment shown in FIG. 5, the processor 520 is further for controlling the transceiver 540 to receive NACK information fed back by the eNB, where the NACK information is sent by the eNB when the eNB successfully receives the SR but fails to receive the uplink data corresponding to the SR; or the processor 520 is further for controlling the transceiver 540 to receive a UL grant fed back by the eNB, where the UL grant is sent by the eNB when the eNB successfully receives the SR but fails to receive the uplink data corresponding to the SR; and the processor 520 is for controlling the transceiver 540 to resend the uplink data according to the UL grant.

Figure 6:
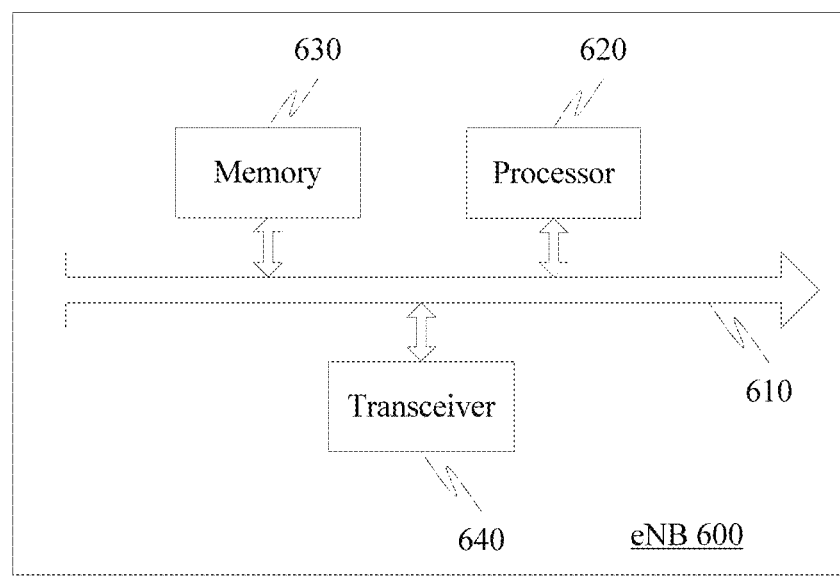
FIG. 6 is a structural block diagram of a base station according to another embodiment of the present disclosure.

Referring to FIG. 6, FIG. 6 shows a structural block diagram of an eNB according to an embodiment of the present disclosure. As shown in FIG. 6, an eNB 600 includes a bus 610, and a processor 620, a memory 630, and a transceiver 640 that communicate with each other by using the bus 610. The memory 630 is for storing one or more instructions, and the processor 620 is for executing the instructions.

The processor 620 is for configuring an uplink contention resource for multiple user equipments UEs, where the uplink contention resource includes an SR symbol for transmitting an uplink SR and a shared symbol for transmitting uplink data.

The processor 620 is further for controlling the transceiver 640 to receive the SR by using the SR symbol in the uplink contention resource.

The processor 620 is further for controlling the transceiver 640 to receive the uplink data by using the shared symbol in the uplink contention resource.

In conclusion, the eNB provided in this embodiment configures the uplink contention resource for the multiple user equipments UEs, controls the transceiver to receive the SR by using the SR symbol in the uplink contention resource, and controls the transceiver to receive the uplink data by using the shared symbol in the uplink contention resource. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data.

In an optional embodiment provided based on the embodiment shown in FIG. 6, the processor 620 is for controlling, on the SR symbol in the uplink contention resource, the transceiver 640 to receive the SR by using a code channel corresponding to each UE.

In an optional embodiment provided based on the embodiment shown in FIG. 6, the processor 620 is further for allocating a corresponding code channel index to the UE;

the processor 620 is further for finding, according to a pre-stored first correspondence, a first cyclic shift value and a first time-domain orthogonal code that are corresponding to each code channel index;

the processor 620 is for detecting, according to the first cyclic shift value and the first time-domain orthogonal code, whether signal energy on a code channel that is corresponding to the code channel index and that is on the SR symbol reaches a predetermined threshold; and the processor 620 is for: if the signal energy reaches the predetermined threshold, determining that the SR sent by the UE corresponding to the code channel index is received.

In an optional embodiment provided based on the embodiment shown in FIG. 6, the processor 620 is for controlling, on the shared symbol in the uplink contention resource, the transceiver 640 to receive the uplink data sent in a MU-MIMO manner.

In an optional embodiment provided based on the embodiment shown in FIG. 6, the shared symbol includes a reference symbol for transmitting a DMRS and a data symbol for transmitting the uplink data;

the processor 620 is further for allocating a corresponding code channel index to the UE;

the processor 620 is for determining, for each successfully received SR, the code channel index corresponding to the SR;

the processor 620 is for finding, according to a pre-stored second correspondence, a pilot index corresponding to the code channel index, and a second cyclic shift value and a second time-domain orthogonal code that are corresponding to the pilot index;

the processor 620 is for performing, according to the second cyclic shift value and the second time-domain orthogonal code, channel estimation on the DMRS carried in the reference symbol in the uplink contention resource, to obtain a channel estimation result; and the processor 620 is for performing MU-MIMO decoding on the data symbol in the uplink contention resource according to the channel estimation result, to obtain the uplink data.

In an optional embodiment provided based on the embodiment shown in FIG. 6, the uplink data includes an MCS and currently transmitted data; and the processor 620 is for performing, according to the MCS, demodulation and channel decoding on the currently transmitted data.

In an optional embodiment provided based on the embodiment shown in FIG. 6, the processor 620 is for allocating a corresponding UE identifier to the UE; and the processor 620 is for controlling the transceiver 640 to send downlink control information DCI to each UE on a PDCCH according to a UE identifier.

A DCI format 0 including an extension field is used for the DCI, an original field of the DCI format 0 includes symbol information corresponding to the shared symbol in the uplink contention resource, and a quantity and a starting location of an RB occupied by the uplink contention resource, and the extension field includes symbol information for indicating the SR symbol; or a DCI format CA is used for the DCI, and the DCI format CA includes symbol information of the SR symbol, symbol information corresponding to the shared symbol, and a quantity and a starting location of an RB occupied by the uplink contention resource.

In an optional embodiment provided based on the embodiment shown in FIG. 6, the processor 620 is further for generating NACK information when the SR is successfully received but the uplink data corresponding to the SR fails to be received; and the processor 620 is for controlling the transceiver 640 to send the NACK information to the UE corresponding to the SR; or the processor 620 is further for: when the SR is successfully received but the uplink data corresponding to the SR fails to be received, generating a UL grant for the UE corresponding to the SR; and the processor 620 is for controlling the transceiver 640 to send the UL grant to the UE corresponding to the SR.

Figure 7:
FIG. 7 is a block diagram of an uplink data sending and receiving system according to an embodiment of the present disclosure.

Referring to FIG. 7, FIG. 7 shows a block diagram of an uplink data sending and receiving system according to an embodiment of the present disclosure. The uplink data sending and receiving system includes an eNB 710 and UE 720.

The UE 720 includes the uplink data sending apparatus provided in either the embodiment shown in FIG. 1 or the embodiment shown in FIG. 2, or the UE 720 is the UE provided in the embodiment shown in FIG. 5.

The eNB 710 includes the uplink data receiving apparatus provided in either the embodiment shown in FIG. 3 or the embodiment shown in FIG. 4, or the eNB 710 is the eNB provided in the embodiment shown in FIG. 6.

Figure 8:
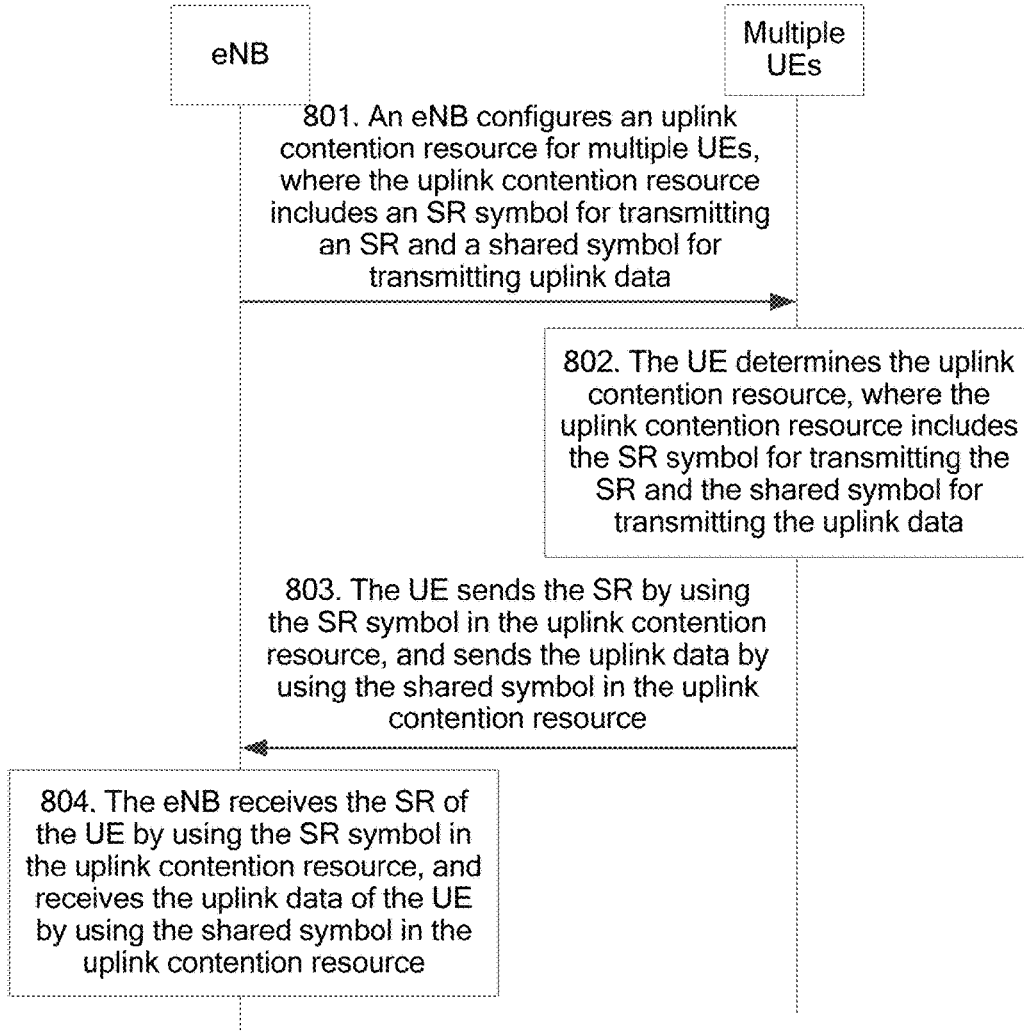
FIG. 8 is a flowchart of an uplink data sending method according to an embodiment of the present disclosure.

Referring to FIG. 8, FIG. 8 shows a flowchart of an uplink data sending method according to an embodiment of the present disclosure. The uplink data sending method includes the following steps.

Step 801: An eNB configures an uplink contention resource for multiple UEs, where the uplink contention resource includes an SR symbol for transmitting an SR and a shared symbol for transmitting uplink data.

The uplink contention resource is a time domain resource on a PUSCH channel. In a time domain, a length of the uplink contention resource is equal to that of a subframe. That is, the uplink contention resource includes two timeslots with a same size. If each timeslot includes a normal cyclic prefix, the uplink shared resource includes 2×7=14 symbols in total. If each timeslot includes an extended cyclic prefix, the uplink shared resource includes 2×6=12 symbols. The symbols include the SR symbol for transmitting the uplink SR and the shared symbol for transmitting the uplink data. In a frequency domain, the uplink contention resource includes at least one RB.

The multiple UEs may share a same uplink contention resource, and send uplink data to the eNB in a contention-based sending manner.

In this embodiment of the present disclosure, some symbols in the uplink contention resource are classified as SR symbols for transmitting SRs, and the other symbols in the uplink contention resource are classified as shared symbols for transmitting uplink data.

An SR is used to notify the eNB that the UE needs to send uplink data.

Step 802: The UE determines the uplink contention resource, where the uplink contention resource includes the SR symbol for transmitting the SR and the shared symbol for transmitting the uplink data.

Specifically, the UE receives configuration information that is of the uplink shared resource and that is sent by the eNB, and determines the uplink shared resource of the UE according to the received configuration information.

In another embodiment, if the eNB and the UE agree on an uplink shared resource configuration manner in advance, the UE may determine the uplink shared resource by itself in the configuration manner that is agreed on in advance.

After receiving the configuration information that is of the uplink contention resource and that is sent by the eNB, the UE determines the uplink contention resource from the configuration information.

Step 803: The UE sends the SR to the eNB by using the SR symbol in the uplink contention resource, and sends the uplink data to the eNB by using the shared symbol in the uplink contention resource.

If the UE needs to send the uplink data, the UE sends both the SR and the uplink data on a same uplink contention resource. If the multiple UEs need to send uplink data, the multiple UEs send respective SRs and respective uplink data on a same uplink contention resource.

Step 804: The eNB receives the SR of the UE by using the SR symbol in the uplink contention resource, and receives the uplink data of the UE by using the shared symbol in the uplink contention resource.

In conclusion, according to the uplink data sending method provided in this embodiment, the UE sends the SR to the eNB by using the SR symbol in the uplink contention resource, and sends the uplink data to the eNB by using the shared symbol in the uplink contention resource, and the eNB receives the SR of the UE by using the SR symbol in the uplink contention resource, and receives the uplink data of the UE by using the shared symbol in the uplink contention resource. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data.

It should be noted that, in the embodiment in FIG. 8, steps related to a UE side may be independently implemented as an uplink data sending method of the UE side, and steps related to an eNB side may be independently implemented as an uplink data receiving method of the eNB side.

In this embodiment, an eNB configures an uplink contention resource for UE, and the uplink contention resource includes an SR symbol for transmitting an SR and a shared symbol for transmitting uplink data. The shared symbol includes a reference symbol and a data symbol. The reference symbol is used to transmit a DMRS, and the DMRS may be used by the eNB to perform channel estimation on designated UE and then receive uplink data of the designated UE. The data symbol is used to transmit uplink data.

Therefore, the uplink contention resource includes the SR symbol, the reference symbol, and the data symbol that have three functions. Optionally, SR symbols in the uplink contention resource are continuously arranged or discretely arranged. Reference symbols are arranged in a fixed order.

Figure 9A:
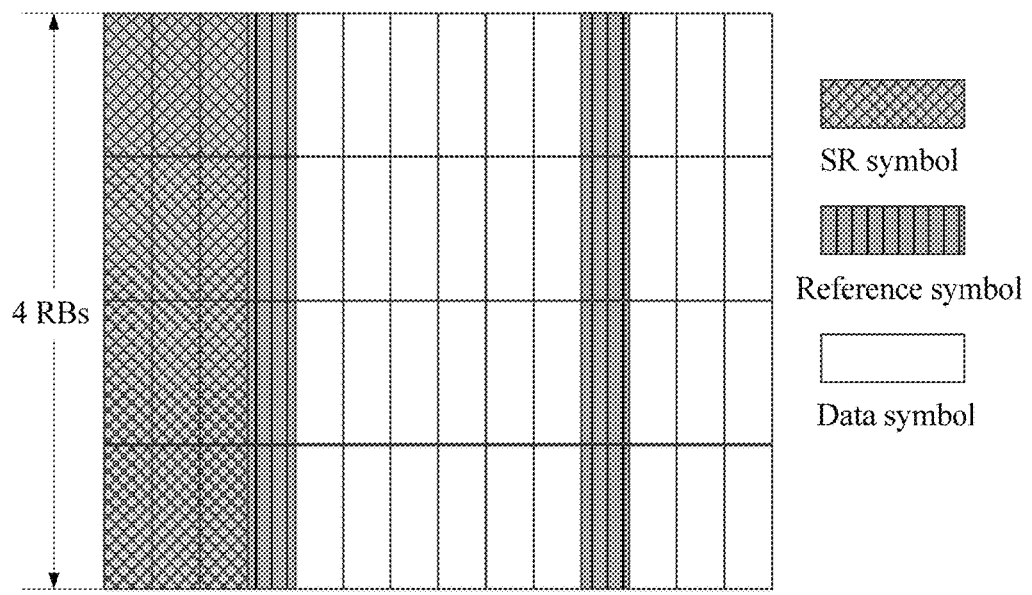
FIG. 9A and FIG. 9B are schematic diagrams of frame structures of an uplink contention resource according to another embodiment of the present disclosure.
Figure 9B:
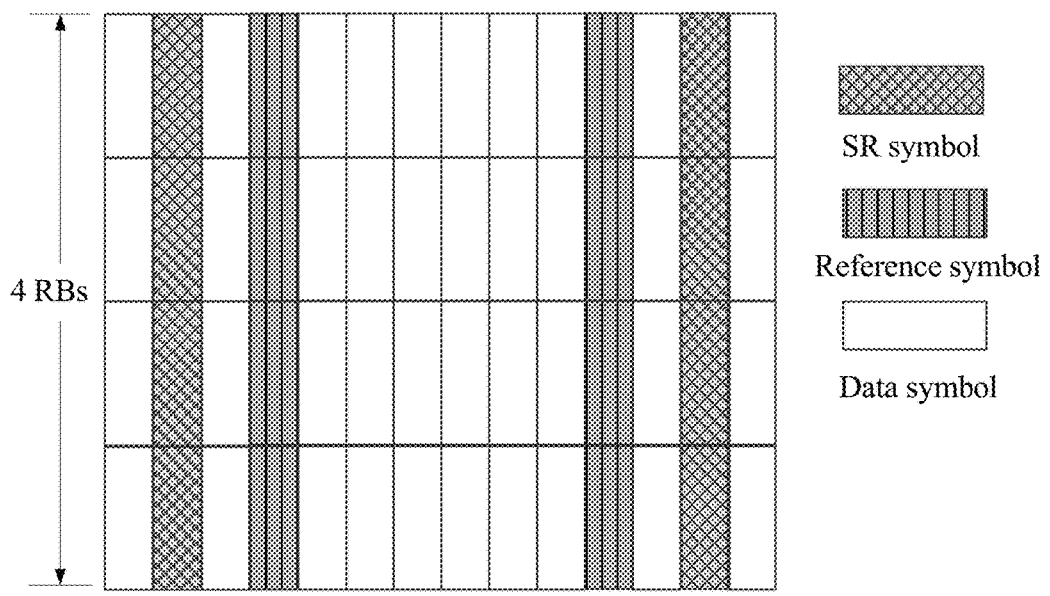

Referring to FIG. 9A and FIG. 9B, FIG. 9A and FIG. 9B separately show schematic diagrams of frame structures of a single uplink contention resource in two different arrangement manners.

FIG. 9A is a schematic diagram of a frame structure of a single uplink contention resource in which SR symbols are continuously arranged. For example, a frequency domain part of the single uplink contention resource occupies four RBs, a time domain part includes two timeslots, each timeslot includes seven symbols, and the single uplink contention resource includes 2×7=14 symbols in total. There are three SR symbols, and the SR symbols are continuously arranged at the first symbol location to the third symbol location. There are two reference symbols, and each reference symbol is arranged at the fourth symbol location of each timeslot. That is, the reference symbols are the fourth symbol and the eleventh symbol from left to right in the diagram. The other symbols are data symbols.

Continuous arrangement of SR symbols is applicable to a low-speed scenario, and this facilitates centralized SR sending.

FIG. 9B is a schematic diagram of a frame structure of a single uplink contention resource in which SR symbols are discretely arranged. A frequency domain part of the single uplink contention resource occupies four RBs, a time domain part includes two timeslots, each timeslot includes seven symbols, and the single uplink contention resource includes 2×7=14 symbols in total. There are two SR symbols, and the SR symbols are discretely arranged at the second symbol location and the thirteenth symbol location. There are two reference symbols, and each reference symbol is arranged at the fourth symbol location of each timeslot. That is, the reference symbols are the fourth symbol and the eleventh symbol from left to right in the diagram. The other symbols are data symbols.

Discrete arrangement of SR symbols is applicable to a high-speed movement scenario, and this helps cope with Doppler shift by using time diversity.

A quantity of RBs occupied by an uplink contention resource in a frequency domain is assigned by an eNB. Four RBs are used as an example for description in both FIG. 9A and FIG. 9B. However, the quantity of RBs is not specifically limited in this embodiment of the present disclosure. A quantity of SR symbols depends on a quantity of UEs carried on a single uplink contention resource. Three SR symbols are used as an example for description in FIG. 9A, and two SR symbols are used as an example for description in FIG. 9B. However, the quantity and an arrangement manner of SR symbols are not specifically limited in this embodiment of the present disclosure.

In the foregoing example for description, each timeslot includes seven symbols. When an extended cyclic prefix is used, each timeslot includes six symbols, and a reference symbol is arranged at the third symbol of each timeslot. For a related quantity and an arrangement manner of SR symbols, refer to FIG. 9A and FIG. 9B. Details are not described again in this embodiment of the present disclosure.

A first point that should be noted is as follows: Each UE sends an SR on an SR symbol in an uplink contention resource by using a code channel corresponding to the UE. Correspondingly, an eNB receives the SR on the SR symbol in the uplink contention resource by using the code channel corresponding to each UE.

Even if multiple UEs send respective uplink data on a same uplink contention resource, because each UE sends an SR in a code division manner, the eNB can receive the SR sent by each UE. Therefore, the eNB can learn of specific UE that sends uplink data on the uplink contention resource.

A second point that should be noted is as follows: Each UE sends uplink data on a shared symbol in an uplink contention resource in a MU-MIMO manner. Correspondingly, an eNB receives, on the shared symbol in the uplink contention resource, the uplink data sent by the UE in a MU-MIMO manner.

If a MU-MIMO technology is used for uplink transmission, multi-user parallel transmission may be implemented by using channel irrelevancy between all UEs. A premise of using the MU-MIMO technology for uplink transmission is to obtain channel estimation of each UE. Therefore, all the UEs need to use different DMRSs. In this way, the eNB may perform channel estimation on each UE by using a DMRS of the UE, and then perform MU-MIMO decoding according to a channel estimation result, so as to successfully receive the uplink data.

Figure 10A:
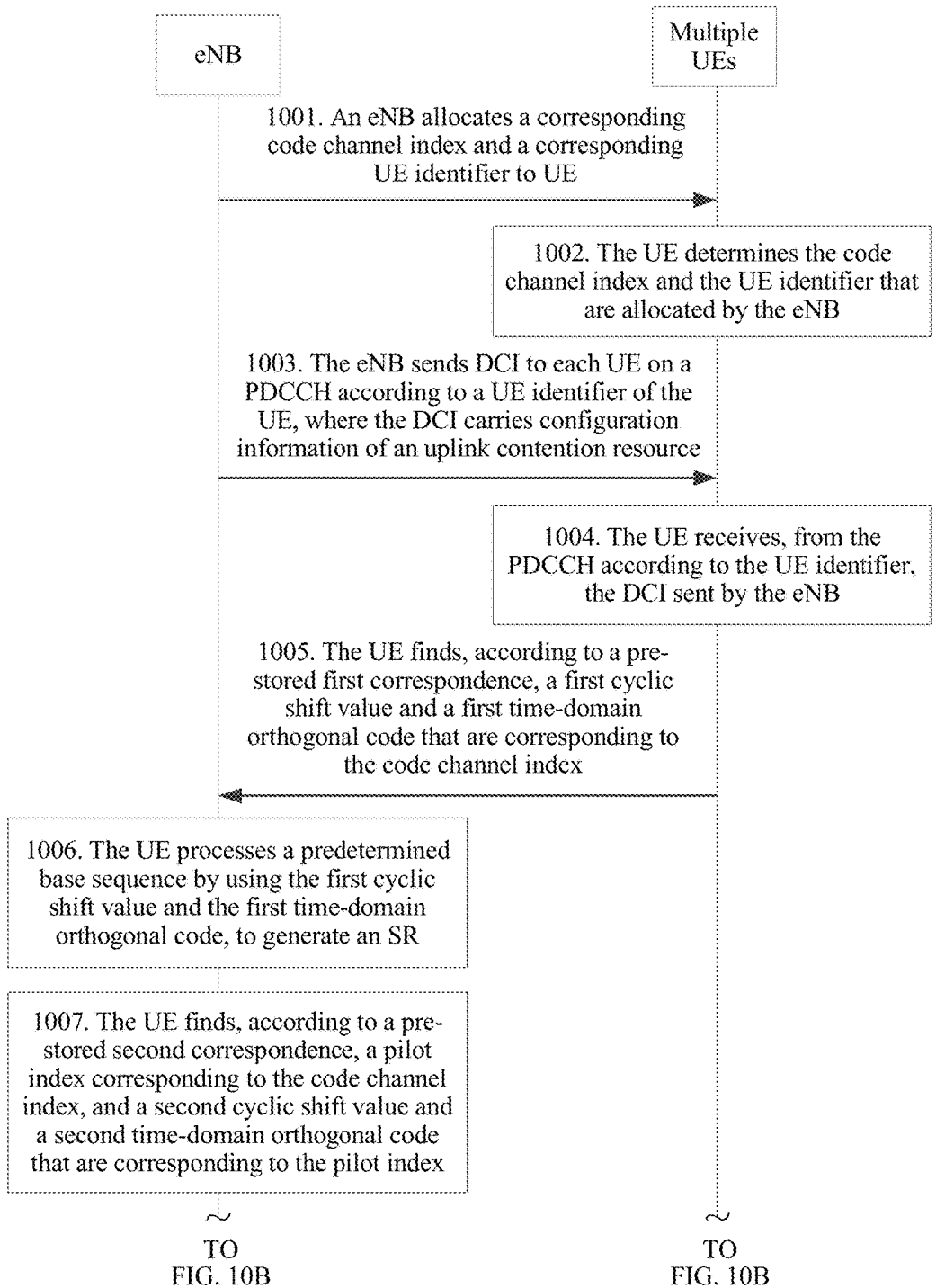

Referring to FIG. 10A, FIG. 10B, and FIG. 10C, FIG. 10A, FIG. 10B, and FIG. 10C show a flowchart of an uplink data sending method according to another embodiment of the present disclosure. The uplink data sending method includes the following steps.

Step 1001: An eNB allocates a corresponding code channel index and a corresponding UE identifier to UE.

If there are multiple UEs, the eNB allocates respectively corresponding code channel indexes and respectively corresponding UE identifiers to the multiple UEs.

The eNB groups UEs that are in a radio resource control connected (RRC_CONNECTED) mode and on which uplink synchronization is performed.

Because the UEs in an RRC-CONNECTED mode have exchanged data with the eNB, the eNB learns of a single-transmission data packet size, a QoS level, and channel information of each UE. The eNB may group the UEs based on the information, and configure a same uplink contention resource for multiple UEs that are classified into a same group.

For example, the eNB classifies UEs with approximately equal single-transmission data packet sizes to a same group. For another example, the eNB classifies UEs with different angles of arrival and irrelevant inter-UE channels to a same group.

The eNB allocates corresponding code channel indexes and corresponding UE identifiers to UEs in a same group by using a predetermined message. There may be m UEs in a same group. The eNB allocates respectively corresponding code channel indexes and respectively corresponding UE identifiers to the m UEs in the same group.

The predetermined message includes but is not limited to an RRC message. Optionally, for each UE, the eNB allocates both a code channel index and a UE identifier by using a same RRC message. Alternatively, for each UE, the eNB separately allocates a code channel index and a UE identifier by using different RRC messages.

Optionally, the UE identifier includes a CA-RNTI and/or an SPS-CA-RNTI.

Step 1002: The UE obtains the code channel index and the UE identifier allocated by the eNB.

Step 1003: The eNB sends DCI to each UE on a PDCCH according to a UE identifier of the UE, where the DCI carries configuration information of an uplink contention resource.

The eNB configures a same uplink contention resource for multiple UEs in a dynamic scheduling manner or a semi-persistent scheduling manner. The dynamic scheduling manner is a manner in which the eNB schedules a currently used time-frequency resource to the UEs by using signaling once. The semi-persistent scheduling manner is a manner in which the eNB schedules a periodically used time-frequency resource to the UEs by using signaling once.

When the dynamic scheduling manner is used, for each UE, the eNB scrambles cyclic redundancy check (CRC) in DCI information by using a CA-RNTI of the UE, and then sends, to the UE by using a PDCCH, the DCI information carrying the scrambled CRC.

When the semi-persistent scheduling manner is used, for each UE, the eNB scrambles CRC in DCI information by using an SPS-CA-RNTI of the UE, and then sends, to the UE by using a PDCCH, the DCI information carrying the scrambled CRC.

Optionally, a DCI format 0 including an extension field or a newly defined DCI format CA is used as an information format of the DCI.

An original field of the DCI format 0 includes symbol information corresponding to a shared symbol in the uplink contention resource, and a quantity and a starting location of an RB occupied by the uplink contention resource. The DCI format 0 with the extension field includes symbol information for indicating an SR symbol, that is, the extension field carries the symbol information of the SR symbol. Optionally, the symbol information is an SR symbol quantity, an SR symbol location, or the like. The SR symbol quantity is used to indicate a quantity of symbols occupied by an SR in the uplink contention resource. The SR symbol location is used to indicate a symbol location of the SR symbol in the uplink contention resource.

The DCI format CA is a redesigned DCI format. The DCI format CA includes symbol information of an SR symbol, symbol information corresponding to a shared symbol, and a quantity and a starting location of an RB occupied by the uplink contention resource. For example, the DCI format CA includes RB allocation, an SR symbol quantity, an SR symbol location, and a pilot group number. The RB allocation is used to indicate a location of the RB occupied by the uplink contention resource in a frequency domain. The SR symbol quantity is used to indicate a quantity of symbols occupied by an SR in the uplink contention resource. The SR symbol location is used to indicate a symbol location of the SR symbol in the uplink contention resource.

That is, specific content of the DCI format CA includes but is not limited to the following table:

TABLE 1

| Information type | Bit quantity | Meaning |
| --- | --- | --- |
| RB allocation | $\log_2[N_{RB}^{UL} (N_{RB}^{UL} + 1)/2]$ | Indicating a location of an allocated RB, where $N_{RB}^{UL}$ is a total uplink RB quantity |
| SR symbol quantity | 2 | Indicating a quantity of symbols occupied by an SR |
| SR symbol location | 14 | Performing mapping according to a bit location, where a bit value 1 represents an SR symbol |

In Table 1, a quantity of bits occupied by the RB allocation depends on the total uplink RB quantity. The SR symbol quantity occupies two bits, and the SR symbol location occupies 14 bits. When a value of an $i^{th}$ bit is 1, it indicates that an $i^{th}$ symbol in the uplink contention resource is an SR symbol. When the value of the $i^{th}$ bit is 0, it indicates that the $i^{th}$ symbol in the uplink contention resource is not an SR symbol.

The quantities of bits occupied by the RB allocation, the SR symbol quantity, and the SR symbol location are merely used as an example for description. The quantities of bits occupied by the RB allocation, the SR symbol quantity, and the SR symbol location are not limited in this embodiment.

Optionally, the specific content of the DCI format CA may further include other information.

For example, when a frequency hopping technology is supported, the DCI format CA further includes a frequency hopping identifier. The frequency hopping identifier occupies one bit and is used to indicate whether frequency hopping occurs in two timeslots of the uplink contention resource.

For another example, when there are multiple groups of pilot resources used to generate a DMRS, the DCI format CA further carries a pilot group number. The pilot group number occupies two bits, and the pilot group number is used to notify UE of a group in which a currently used pilot resource is located.

Step 1004: The UE receives, from the PDCCH according to the UE identifier, the DCI sent by the eNB.

The UE receives, from the PDCCH by using the UE identifier, the DCI sent by the eNB. Only UE having the UE identifier can successfully descramble the DCI.

The UE obtains, from the DCI, related resource configuration information of the uplink contention resource configured by the eNB.

When the dynamic scheduling manner is used, the UE performs descrambling by using the CA-RNTI, to obtain the DCI information.

When the semi-persistent scheduling manner is used, the UE performs descrambling by using the SPS-CA-RNTI, to obtain the DCI information.

Step 1005: The UE finds, according to a pre-stored first correspondence, a first cyclic shift value and a first time-domain orthogonal code that are corresponding to the code channel index.

Both the eNB and the UE store the first correspondence in advance. The first correspondence is a correspondence between the code channel index and each of the first cyclic shift value and the first time-domain orthogonal code. The first cyclic shift value and the first time-domain orthogonal code are information required by the UE to generate an SR.

The first cyclic shift value is a cyclic shift value obtained when cyclic shift is performed on a predetermined base sequence to generate an SR sequence. A length of the SR sequence is a product of 12 and an RB quantity in the uplink contention resource. Optionally, a range of the first cyclic shift value is [0, 11], and a value interval between first cyclic shift values is set by a higher layer of the eNB, and may be 1, 2, or 3. For example, if the value interval is set to 2, there are 12/2=6 available first cyclic shift values. The base sequence may be a Zadoff-Chu sequence, which is referred to as a ZC sequence for short.

The first time-domain orthogonal code refers to an orthogonal sequence that is used when time domain extension is performed on the SR sequence. The first time-domain orthogonal code is a DFT sequence or a Walsh sequence. Optionally, a length of the DFT sequence is 3, and a length of the Walsh sequence is 4.

The DFT sequence with a length of 3 is shown in Table 2:

TABLE 2

| Sequence index number | Orthogonal sequence |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The Walsh sequence with a length of 4 is shown in Table 3:

TABLE 3

| Sequence index number | Orthogonal sequence |
| --- | --- |
| 0 | [+1 +1 +1 +1] |
| 1 | [+1 −1 +1 −1] |
| 2 | [+1 −1 −1 +1] |
| 3 | [+1 +1 −1 −1] |

The UE finds the corresponding first cyclic shift value and the corresponding first time-domain orthogonal code by using the code channel index allocated by the eNB.

Step 1006: The UE processes a predetermined base sequence by using the first cyclic shift value and the first time-domain orthogonal code, to generate an SR.

Multiple UEs may use a same base sequence, or may use different base sequences. Generally, UEs located in a same cell use a same base sequence. A specific base sequence used by the UE is well-known by a person skilled in the art. Details are not described in this embodiment.

The UE performs cyclic shift on the predetermined base sequence by using the first cyclic shift value, to generate the SR sequence with a length of the product of 12 and an RB quantity, and then performs time domain extension on the SR sequence by using the first time-domain orthogonal code, to generate the SR.

Step 1007: The UE finds, according to a pre-stored second correspondence, a pilot index corresponding to the code channel index, and a second cyclic shift value and a second time-domain orthogonal code that are corresponding to the pilot index.

Both the eNB and the UE store the second correspondence in advance. The second correspondence includes a correspondence between the code channel index and the pilot index, and a correspondence between the pilot index and each of the second cyclic shift value and the second time-domain orthogonal code. The second cyclic shift value and the second time-domain orthogonal code are information required by the UE to generate a DMRS.

One code channel index is corresponding to only one pilot index, and one pilot index may be corresponding to more than one code channel index. For example, a code channel index 01 is corresponding to a pilot index 07.

One pilot index is corresponding to one second cyclic shift value and one second time-domain orthogonal code, as shown in Table 4 below:

TABLE 4

| Pilot index | $n_{DMRS,\lambda}^{(2)}$ | [$w^{(\lambda)}(0)$ $w^{(\lambda)}(1)$] |
| --- | --- | --- |
| 0 | 0 | [1, 1] |
| 1 | 6 | [1, 1] |
| 2 | 3 | [1, 1] |
| 3 | 9 | [1, 1] |
| 4 | 0 | [1, −1] |
| 5 | 6 | [1, −1] |
| 6 | 3 | [1, −1] |
| 7 | 9 | [1, −1] |
| 8 | 2 | [1, 1] |
| 9 | 8 | [1, 1] |
| 10 | 5 | [1, 1] |
| 11 | 11 | [1, 1] |
| 12 | 2 | [1, −1] |
| 13 | 8 | [1, −1] |
| 14 | 5 | [1, −1] |
| 15 | 11 | [1, −1] |
| 16 | 4 | [1, 1] |
| 17 | 10 | [1, 1] |
| 18 | 7 | [1, 1] |

TABLE 4-continued

| Pilot index | $n_{DMRS,\lambda}^{(2)}$ | $[w^{(\lambda)}(0)\ w^{(\lambda)}(1)]$ |
|---|---|---|
| 19 | 1 | [1, 1] |
| 20 | 4 | [1, −1] |
| 21 | 10 | [1, −1] |
| 22 | 7 | [1, −1] |
| 23 | 1 | [1, −1] |

The pilot index is from 0 to 23, the second cyclic shift value is $n_{DMRS,\lambda}^{(2)}$, and the second time-domain orthogonal code is $[w^{(\lambda)}(0)\ w^{(\lambda)}(1)]$.

It should be noted that, to ensure channel estimation performance, pilot resources in Table 4 may be classified into three groups for use. In this case, Table 4 may be modified into Table 5:

| Pilot group number | Pilot index | $n_{DMRS,\lambda}^{(2)}$ | $[w^{(\lambda)}(0)\ w^{(\lambda)}(1)]$ |
|---|---|---|---|
| 00 | 0 | 0 | [1, 1] |
|    | 1 | 6 | [1, 1] |
|    | 2 | 3 | [1, 1] |
|    | 3 | 9 | [1, 1] |
|    | 4 | 0 | [1, −1] |
|    | 5 | 6 | [1, −1] |
|    | 6 | 3 | [1, −1] |
|    | 7 | 9 | [1, −1] |
| 01 | 0 | 2 | [1, 1] |
|    | 1 | 8 | [1, 1] |
|    | 2 | 5 | [1, 1] |
|    | 3 | 11 | [1, 1] |
|    | 4 | 2 | [1, −1] |
|    | 5 | 8 | [1, −1] |
|    | 6 | 5 | [1, −1] |
|    | 7 | 11 | [1, −1] |
| 02 | 0 | 4 | [1, 1] |
|    | 1 | 10 | [1, 1] |
|    | 2 | 7 | [1, 1] |
|    | 3 | 1 | [1, 1] |
|    | 4 | 4 | [1, −1] |
|    | 5 | 10 | [1, −1] |
|    | 6 | 7 | [1, −1] |
|    | 7 | 1 | [1, −1] |

Optionally, the eNB indicates a currently used pilot group number to the UE in the DCI information in step 1003.

After learning of the code channel index, the UE finds the corresponding pilot index by using the code channel index, and then finds the corresponding second cyclic shift value and the corresponding second time-domain orthogonal code by using the pilot index.

If there are multiple groups of pilot resources, the UE finds the corresponding pilot index in a currently used pilot resource group by using the code channel index. A pilot group number of the pilot resource group is indicated by the eNB in the DCI information.

Step 1008: The UE processes a predetermined base sequence by using the second cyclic shift value and the second time-domain orthogonal code, to generate a DMRS.

The base sequence used by the UE in step 1008 is generally the same as the base sequence used in step 1006.

The UE performs cyclic shift on the predetermined base sequence by using the second cyclic shift value, to generate a reference signal sequence with a length of the product of 12 and an RB quantity, and then performs time domain extension on the reference signal sequence by using the second time-domain orthogonal code, to generate the DMRS.

Step 1009: The UE sends the SR by adding the SR to an SR symbol in the uplink contention resource, sends the DMRS by adding the DMRS to a reference signal in the uplink contention resource, and send uplink data by adding the uplink data to a data symbol in the uplink contention resource.

That is, the UE sends all of the SR, the DMRS, and the uplink data on a same uplink contention resource.

Optionally, the uplink data includes currently transmitted data.

Optionally, the uplink data includes an MCS and currently transmitted data. In this case, the UE performs multiplex transmission on the MCS and the currently transmitted data by separately adding the MCS and the currently transmitted data to data symbols at different locations in the uplink contention resource. Optionally, a channel coding rate used for the MCS is lower than a channel coding rate used for the currently transmitted data.

Figure 11:
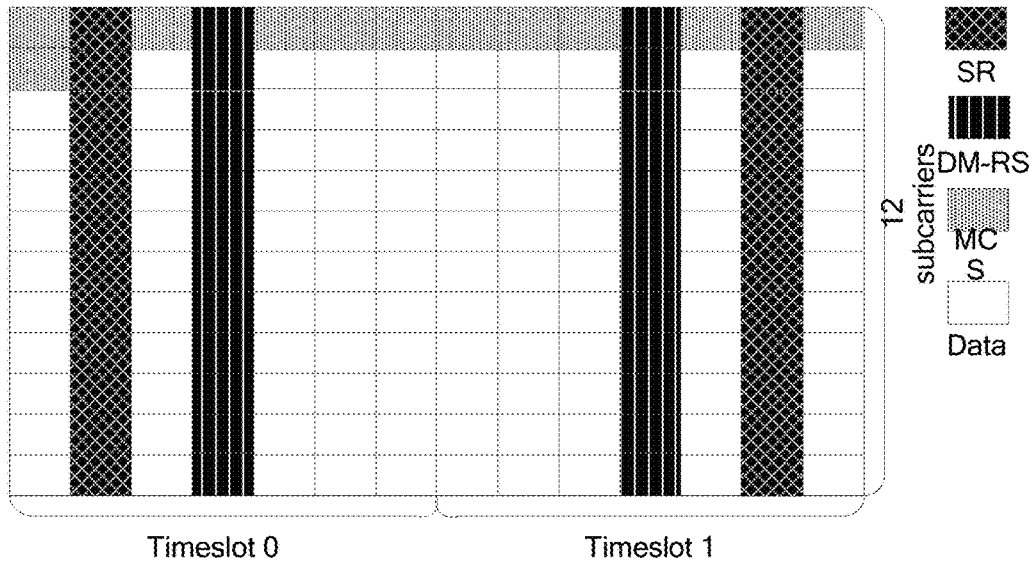
FIG. 11 is a schematic diagram of a frame structure in which multiplex transmission is performed on an MCS and currently transmitted data according to another embodiment of the present disclosure.

For example, transmission locations of the MCS and the currently transmitted data are shown in FIG. 11. The MCS is arranged in a front resource element, so that the eNB preferentially obtains the MCS by means of decoding. The currently transmitted data is arranged in aback resource element, so that the eNB decodes, by using the MCS preferentially obtained by means of decoding, the data subsequently obtained by means of decoding.

Step 1010: The eNB finds, according to the pre-stored first correspondence, a first cyclic shift value and a first time-domain orthogonal code that are corresponding to each code channel index.

If the uplink contention resource is allocated to multiple UEs, there are multiple corresponding code channel indexes. Because all the multiple UEs may send data on the uplink contention resource, the eNB needs to detect whether there is an SR on each code channel.

The eNB finds, according to the pre-stored first correspondence, the first cyclic shift value and the first time-domain orthogonal code that are corresponding to each code channel index.

Step 1011: The eNB detects, according to the first cyclic shift value and the first time-domain orthogonal code, whether signal energy on a code channel that is corresponding to the code channel index and that is on the SR symbol reaches a predetermined threshold.

The eNB does not need to perform detailed decoding on an SR received on a code channel. The eNB only needs to detect, on the SR symbol in the uplink contention resource, whether signal energy on each code channel reaches the predetermined threshold.

If signal energy on a current code channel reaches the predetermined threshold, step 1014 is performed.

If signal energy on a current code channel does not reach the predetermined threshold, the eNB determines that no SR is received on this code channel.

Step 1012: If the signal energy reaches the predetermined threshold, the eNB determines that the SR sent by the UE corresponding to the code channel index is received.

Step 1013: For each successfully received SR, the eNB determines a code channel index corresponding to the SR.

For the successfully received SR, the eNB attempts to receive uplink data sent by UE corresponding to the SR. In this case, the eNB first needs to perform channel estimation by using a DMRS sent by the UE, and then receive the uplink data according to a channel estimation result.

Step 1014: The eNB finds, according to the pre-stored second correspondence, the pilot index corresponding to the code channel index, and the second cyclic shift value and the second time-domain orthogonal code that are corresponding to the pilot index.

Step 1015: The eNB performs, according to the second cyclic shift value and the second time-domain orthogonal code, channel estimation on the DMRS carried in the reference symbol in the uplink contention resource, to obtain a channel estimation result.

Step 1016: The eNB performs MU-MIMO decoding on the data symbol in the uplink contention resource according to the channel estimation result, to obtain the uplink data.

If n SRs are successfully received, step 1014 to step 1016 are performed n times.

It should be noted that, if the uplink data includes the MCS and the currently transmitted data, after obtaining the uplink data by means of decoding, the eNB further performs, according to the MCS, demodulation and channel decoding on the currently transmitted data.

In conclusion, according to the uplink data sending method provided in this embodiment, the eNB allocates the corresponding UE identifier to the UE; the eNB sends the DCI to the multiple UEs on the PDCCH according to the UE identifiers; the UE obtains, from the DCI, the uplink contention resource configured by the eNB, sends the SR to the eNB by using the SR symbol in the uplink contention resource configured by the eNB, and sends the uplink data to the eNB by using the shared symbol in the uplink contention resource; the eNB receives the SR sent by the UE by using the SR symbol in the uplink contention resource, and receives the uplink data sent by the UE by using the shared symbol in the uplink contention resource; and the eNB sends corresponding feedback information to corresponding UE according to a successfully received SR. This resolves a prior-art problem that when multiple UEs send uplink data to an eNB by using a same uplink contention resource and a contention collision occurs, the eNB may fail to decode the uplink data sent by all the UEs, resulting in a total waste of the uplink contention resource. A new contention-based uplink data transmission manner is provided. In this uplink data transmission manner, when failing to receive the uplink data of the UEs, the eNB may still determine, according to a successfully received SR, specific UE that sends uplink data.

It should be noted that, in the embodiment in FIG. 10A, FIG. 10B, and FIG. 10C, steps related to a UE side may be independently implemented as an uplink data sending method of the UE side, and steps related to an eNB side may be independently implemented as an uplink data receiving method of the eNB side.

Figure 12:
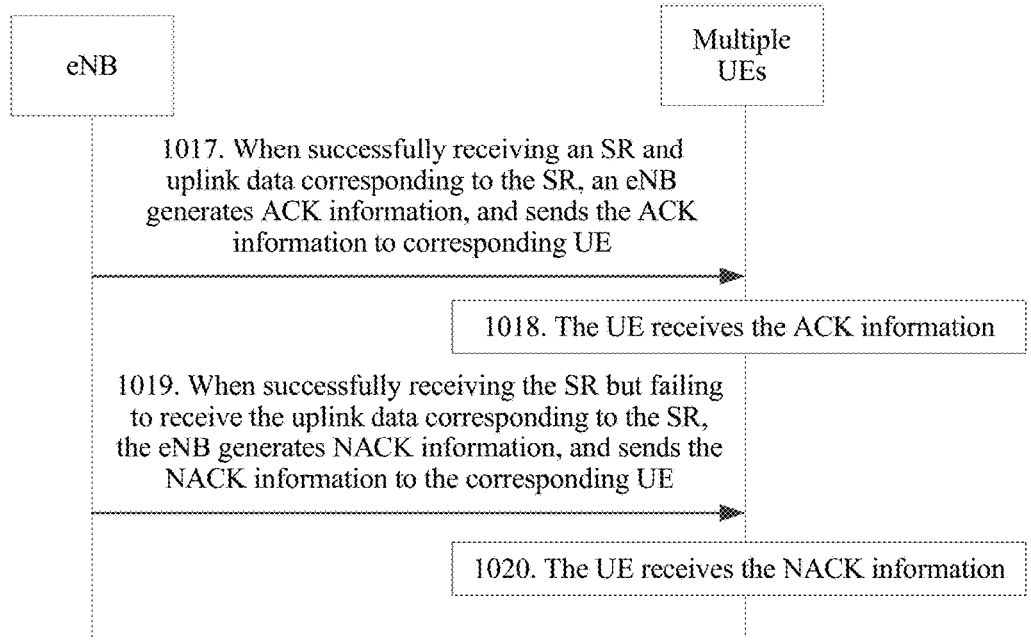
FIG. 12 is a flowchart of an uplink data sending method according to another embodiment of the present disclosure.

In a possible implementation, as shown in FIG. 12, after step 1016, the method further includes the following steps.

Step 1017: When successfully receiving the SR and the uplink data corresponding to the SR, the eNB generates ACK information, and sends the ACK information to the corresponding UE.

For UE, if the eNB successfully receives an SR and uplink data that are sent by the UE, the eNB generates acknowledgement information, that is, ACK information.

The eNB may send the ACK information to the UE by using a designated downlink resource on a physical HARQ indicator channel (PHICH). A resource location of the designated downlink resource may be obtained through calculation by using a resource location of the uplink contention resource and a DMRS of the UE. For a calculation formula, refer to a related LTE communications protocol.

Step 1018: The UE receives the ACK information.

The UE receives the ACK information by using the designated downlink resource on the PHICH channel.

After determining that the uplink data sent by the UE in a contention mode is successfully received, the UE may continue to send other uplink data in the contention mode.

Step 1019: When successfully receiving the SR but failing to receive the uplink data corresponding to the SR, the eNB generates NACK information, and sends the NACK information to the corresponding UE.

For UE, if the eNB successfully receives an SR sent by the UE but fails to receive uplink data sent by the UE, the eNB generates negative acknowledgement information, that is, NACK information.

The eNB may send the NACK information to the UE by using a designated downlink resource on a PHICH. A resource location of the designated downlink resource may be obtained through calculation by using a resource location of the uplink contention resource and a DMRS of the UE. For a calculation formula, refer to a related LTE communications protocol.

Step 1020: The UE receives the NACK information.

The UE receives the NACK information by using the designated downlink resource on the PHICH channel.

After determining that the uplink data sent by the UE in a contention mode is not successfully received, the UE may resend the uplink data in the contention mode.

In conclusion, in this embodiment, the eNB delivers the ACK information or the NACK information to the UE, so that the UE can obtain a feedback from an eNB side even if the UE fails to transmit the uplink data in a contention manner. Then, the UE determines whether to resend the uplink data or continue to transmit other uplink data, so that efficiency of communication between the eNB and the UE is improved.

Figure 13:
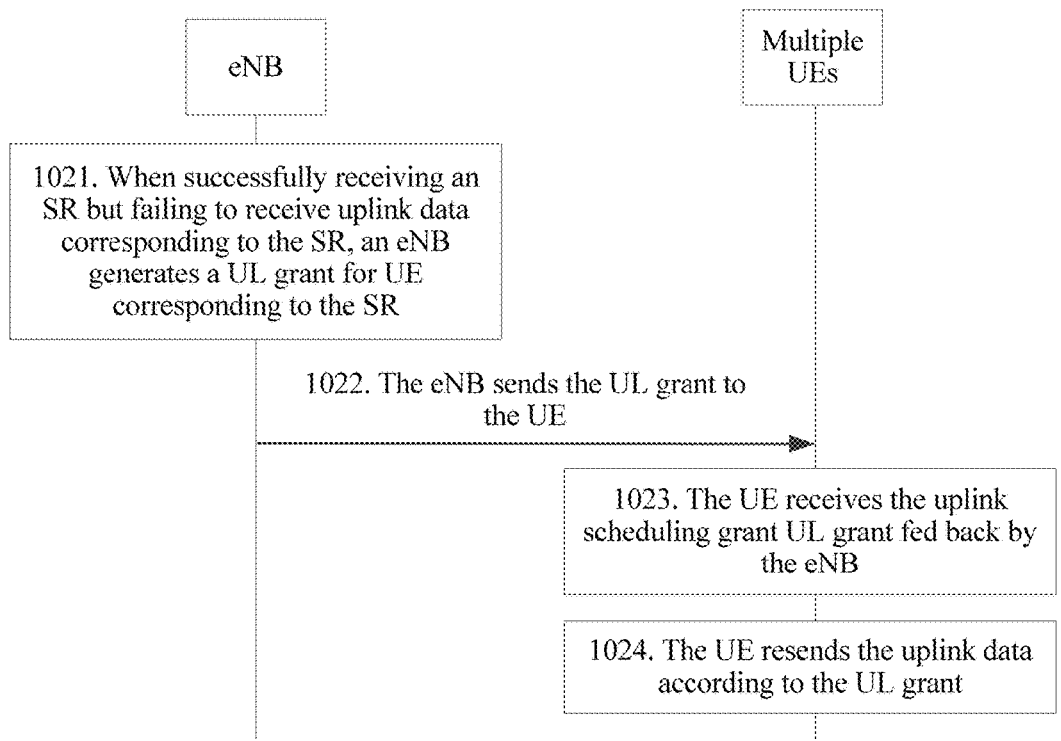
FIG. 13 is a flowchart of an uplink data sending method according to another embodiment of the present disclosure.

In another possible implementation, as shown in FIG. 13, step 1019 and step 1020 may be replaced by step 1021 to step 1024 for implementation.

Step 1021: When successfully receiving the SR but failing to receive the uplink data corresponding to the SR, the eNB generates a UL grant for the UE corresponding to the SR.

The UL grant is indication information that is used when the eNB allocates an uplink transmission resource to the UE in a scheduling based manner. That is, the UL grant carries configuration information of the uplink transmission resource exclusively allocated by the eNB to the UE.

Step 1022: The eNB sends the UL grant to the UE.

The eNB sends the UL grant to the UE by using a DCI format 0 on a PDCCH channel.

Step 1023: The UE receives the UL grant fed back by the eNB.

The UL grant is sent by the eNB when the eNB successfully receives the SR but fails to receive the uplink data corresponding to the SR.

Step 1024: The UE resends the uplink data according to the UL grant.

In conclusion, in this embodiment, the eNB directly delivers the UL grant to the UE that fails to transmit the uplink data, so that the UE can retransmit the uplink data in a scheduling-based manner. Therefore, signaling interaction between the UE and the eNB is effectively reduced, and signaling resources on an eNB side are saved.

It should be noted that, in the embodiments in FIG. 12 and FIG. 13, steps related to a UE side may be independently implemented as an uplink data sending method of the UE side, and steps related to an eNB side may be independently implemented as an uplink data receiving method of the eNB side.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A communication device, comprising:
    a transceiver;
    a processor; and
    a memory for storing one or more instructions which, when executed by the processor, cause the processor to:
        determine an uplink contention resource, wherein the uplink contention resource comprises a scheduling request (SR) symbol for transmitting an uplink SR and shared symbols for transmitting uplink data,
        control the transceiver to send the SR by using the SR symbol in the uplink contention resource,
        control the transceiver to send the uplink data by using the shared symbols in the uplink contention resource,
        control, on the shared symbols in the uplink contention resource, the transceiver to send the uplink data in a multi-user multiple-input multiple-output (MU-MIMO) manner, wherein the shared symbols comprises a reference symbol for transmitting a demodulation reference signal (DMRS) and data symbols for transmitting the uplink data,
        determine a code channel index allocated by an eNB,
        find, according to a pre-stored second correspondence, a pilot index corresponding to the code channel index, and a second cyclic shift value and a second time-domain orthogonal code that are corresponding to the pilot index,
        process a predetermined base sequence by using the second cyclic shift value and the second time-domain orthogonal code, to generate the DMRS,
        control the transceiver to send the DMRS by adding the DMRS in the uplink contention resource, and to send the uplink data by mapping the uplink data to the data symbols in the uplink contention resource, wherein the uplink data comprises a modulation and coding scheme (MCS) and currently transmitted data, and
        perform multiplex transmission on the MCS and the currently transmitted data by separately adding the MCS and the currently transmitted data to the uplink contention resource, wherein a channel coding rate used for the MCS is lower than a channel coding rate used for the currently transmitted data.

2. The communication device according to claim 1, wherein the one or more instructions, when executed by the processor, cause the processor to:
    control, on the SR symbol in the uplink contention resource, the transceiver to send the SR by using a code channel corresponding to a user equipment (UE).

3. The communication device according to claim 1, wherein the one or more instructions, when executed by the processor, cause the processor to:
    obtain a user equipment (UE) identifier allocated by an evolved Node B (eNB), wherein the UE identifier comprises a contention access-cell radio network temporary identifier (CA-RNTI) or a semi-persistent scheduling-contention access-cell radio network temporary identifier (SPS-CA-RNTI);
    control the transceiver to receive downlink control information (DCI) from a physical downlink control channel (PDCCH) according to the UE identifier; and
    determine, from the DCI, the uplink contention resource configured by the eNB, and wherein a DCI format 0 comprising an extension field is used for the DCI, an original field of the DCI format 0 comprises symbol information corresponding to the shared symbol in the uplink contention resource, and a quantity and a starting location of a resource block occupied by the uplink contention resource, and the extension field comprises symbol information for indicating the SR symbol; or a DCI format CA is used for the DCI, and the DCI format CA comprises symbol information of the SR symbol, symbol information corresponding to the shared symbol, and a quantity and a starting location of a resource block occupied by the uplink contention resource.

4. An evolved base station, comprising:
    a transceiver;
    a processor; and
    memory for storing one or more instructions which, when executed by the processor, cause the processor to:
        configure an uplink contention resource for multiple user equipment (UEs), wherein the uplink contention resource comprises a scheduling request (SR) symbol for transmitting an uplink SR and shared symbols for transmitting uplink data,
        control the transceiver to receive the SR by using the SR symbol in the uplink contention resource,
        control the transceiver to receive the uplink data by using the shared symbols in the uplink contention resource,
        control, on the SR symbol in the uplink contention resource, the transceiver to receive the SR by using a code channel corresponding to each UE,
        allocate a corresponding code channel index to the UE,
        find, according to a pre-stored first correspondence, a first cyclic shift value and a first time-domain orthogonal code that are corresponding to each code channel index,
        detect, according to the first cyclic shift value and the first time-domain orthogonal code, whether signal energy on a code channel that is corresponding to the code channel index and that is on the SR symbol reaches a predetermined threshold, and
        when the signal energy reaches the predetermined threshold, determine that the SR sent by the UE corresponding to the code channel index is received.

5. The base station according to claim 4, wherein the one or more instructions, when executed by the processor, cause the processor to:
    control, on the shared symbol in the uplink contention resource, the transceiver to receive the uplink data sent in a multi-user multiple-input multiple-output (MU-MIMO) manner.

6. The base station according to claim 5, wherein:
    the shared symbols comprises a reference symbol for transmitting a demodulation reference signal (DMRS) and data symbols for transmitting the uplink data; and
    the one or more instructions, when executed by the processor, cause the processor to:
        allocate a corresponding code channel index to the UE,
        determine, for each successfully received SR, the code channel index corresponding to the SR, find, according to a pre-stored second correspondence, a pilot index corresponding to the code channel index, and a second cyclic shift value and a second time-domain orthogonal code that are corresponding to the pilot index, perform, according to the second cyclic shift value and the second time-domain orthogonal code, channel estimation on the DMRS carried in the reference symbol in the uplink contention resource, to obtain a channel estimation result, and perform MU-MIMO decoding on the data symbols in the uplink contention resource according to the channel estimation result, to obtain the uplink data.

7. The base station according to claim 6, wherein:
the uplink data comprises a modulation and coding scheme (MCS) and currently transmitted data; and
the one or more instructions, when executed by the processor, cause the processor to perform, according to the MCS, demodulation and channel decoding on the currently transmitted data.

8. The base station according to claim 4, wherein the one or more instructions which, when executed by the processor, cause the processor to:
allocate a corresponding UE identifier to the UE; and
control the transceiver to send downlink control information (DCI) to each UE on a physical downlink control channel (PDCCH) according to a UE identifier, and wherein a DCI format 0 comprising an extension field is used for the DCI, an original field of the DCI format 0 comprises symbol information corresponding to the shared symbol in the uplink contention resource, and a quantity and a starting location of a resource block occupied by the uplink contention resource, and the extension field comprises symbol information for indicating the SR symbol; or a DCI format CA is used for the DCI, and the DCI format CA comprises symbol information of the SR symbol, symbol information corresponding to the shared symbol, and a quantity and a starting location of a resource block occupied by the uplink contention resource.

9. An uplink data sending method, comprising:
determining an uplink contention resource, wherein the uplink contention resource comprises a scheduling request (SR) symbol for transmitting an uplink SR and shared symbols for transmitting uplink data;
determining a code channel index allocated by an eNB; and
sending the SR to the eNB on the SR symbol in the uplink contention resource by using a code channel corresponding to a user equipment (UE), comprising:
finding, according to a pre-stored first correspondence, a first cyclic shift value and a first time-domain orthogonal code that are corresponding to the code channel index,
processing a predetermined base sequence by using the first cyclic shift value and the first time-domain orthogonal code, to generate the SR, and
sending the SR by adding the SR to the SR symbol in the uplink contention resource; and
sending the uplink data by using the shared symbols in the uplink contention resource.

10. The method according to claim 9, wherein determining an uplink contention resource comprises:
obtaining a user equipment (UE) identifier allocated by a evolved Node B (eNB), wherein the UE identifier comprises a contention access-cell radio network temporary identifier (CA-RNTI) or a semi-persistent scheduling-contention access-cell radio network temporary identifier (SPS-CA-RNTI);
receiving downlink control information (DCI) from a physical downlink control channel (PDCCH) according to the UE identifier; and
determining, from the DCI, an uplink shared subframe configured by the eNB, and wherein a DCI format 0 comprising an extension field is used for the DCI, an original field of the DCI format 0 comprises symbol information corresponding to the shared symbol in the uplink contention resource, and a quantity and a starting location of a resource block occupied by the uplink contention resource, and the extension field comprises symbol information for indicating the SR symbol; or a DCI format CA is used for the DCI, and the DCI format CA comprises symbol information of the SR symbol, symbol information corresponding to the shared symbol, and a quantity and a starting location of a resource block occupied by the uplink contention resource.

11. An uplink data sending method, comprising:
determining an uplink contention resource, wherein the uplink contention resource comprises a scheduling request (SR) symbol for transmitting an uplink SR and shared symbols for transmitting uplink data;
sending the SR by using the SR symbol in the uplink contention resource;
receiving a code channel index allocated by an eNB;
sending the uplink data on the shared symbols in the uplink contention resource in a multi-user multiple-input multiple-output (MU-MIMO) manner, wherein the shared symbol comprises a reference symbol for transmitting a demodulation reference signal (DMRS) and data symbols for transmitting the uplink data, and wherein sending the uplink data on the shared symbols in the uplink contention resource in a multi-user multiple-input multiple-output (MU-MIMO) manner comprises:
finding, according to a pre-stored second correspondence, a pilot index corresponding to the code channel index, and a second cyclic shift value and a second time-domain orthogonal code that are corresponding to the pilot index,
processing a predetermined base sequence by using the second cyclic shift value and the second time-domain orthogonal code, to generate the DMRS,
sending the DMRS by adding the DMRS to the reference symbol in the uplink contention resource, and
sending the uplink data by adding the uplink data to data symbols at different resource locations in the uplink contention resource, wherein the uplink data comprises a modulation and coding scheme (MC S) and currently transmitted data; and
wherein sending the uplink data by adding the uplink data to the data symbols at different resource locations in the uplink contention resource comprises:
performing multiplex transmission on the MCS and the currently transmitted data by separately adding the MCS and the currently transmitted data to different resource locations in the uplink contention resource, and wherein a channel coding rate used for the MCS is lower than a channel coding rate used for the currently transmitted data.

* * * * *